(12) United States Patent
Won

(10) Patent No.: US 10,496,275 B2
(45) Date of Patent: Dec. 3, 2019

(54) MULTI-WINDOW KEYBOARD

(71) Applicant: Microsoft Technology Licensing, LLC, Redmond, WA (US)

(72) Inventor: Sung Joon Won, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 312 days.

(21) Appl. No.: 14/880,395

(22) Filed: Oct. 12, 2015

(65) Prior Publication Data
US 2017/0102870 A1 Apr. 13, 2017

(51) Int. Cl.
| G06F 3/0481 | (2013.01) |
| G06F 3/0485 | (2013.01) |
| G06F 3/0482 | (2013.01) |
| G06F 3/0488 | (2013.01) |
| G06F 3/0484 | (2013.01) |

(52) U.S. Cl.
CPC ........ *G06F 3/04886* (2013.01); *G06F 3/0481* (2013.01); *G06F 3/0482* (2013.01); *G06F 3/0485* (2013.01); *G06F 3/04842* (2013.01)

(58) Field of Classification Search
CPC ............... G06F 3/04886; G06F 3/0481; G06F 3/04842; G06F 3/0485; G06F 3/4082; G06F 3/0451; G06F 2203/04803
See application file for complete search history.

(56) References Cited

U.S. PATENT DOCUMENTS

| 5,963,671 | A | 10/1999 | Comerford et al. |
| 8,400,417 | B2 | 3/2013 | Ording et al. |
| 9,128,921 | B2 | 9/2015 | Griffin et al. |

(Continued)

FOREIGN PATENT DOCUMENTS

| CA | 2842031 | 8/2014 |
| EP | 2326068 A1 | 5/2011 |
| WO | 2014178044 A1 | 11/2014 |

OTHER PUBLICATIONS

PCT International Search Report and Written Opinion in International Application PCT/US2016/054570, dated Mar. 8, 2017, 22 pgs.
PCT 2nd Written Opinion in International Application PCT/US2016/054570, dated Jun. 23, 2017, 7 pgs.
PCT International Search Report and Written Opinion in International Application PCT/US2016/024876, dated Jun. 19, 2017, 17 pgs.

(Continued)

*Primary Examiner* — Aaron Lowenberger

(57) ABSTRACT

Examples of the present disclosure describe systems and methods associated with a multi-window soft input keyboard application. A multi-window soft input keyboard application is displayed. The soft input keyboard application is used to provide application command control for one or more applications. The soft input keyboard application may comprise a first application window that displays two or more user interface elements for services of the soft input keyboard application. In examples, the first application window displays/updates based on the detected foreground application. The user interface elements are usable for application command control of the detected foreground application. An exemplary soft input keyboard application may further comprise a second application window that displays a soft input keyboard. Display of the second application window may update including replacing display of the soft input keyboard based on selection of a user interface element of the first application window. Other examples are also described.

20 Claims, 28 Drawing Sheets

(56) References Cited

U.S. PATENT DOCUMENTS

| | | | | |
|---|---|---|---|---|
| 2004/0015539 | A1* | 1/2004 | Alegria | G06F 17/2264 |
| | | | | 709/203 |
| 2007/0120832 | A1 | 5/2007 | Saarinen et al. | |
| 2010/0123724 | A1 | 5/2010 | Moore et al. | |
| 2011/0087990 | A1 | 4/2011 | Ng et al. | |
| 2012/0233570 | A1* | 9/2012 | Li | G06F 3/0482 |
| | | | | 715/825 |
| 2013/0082935 | A1 | 4/2013 | Duggan et al. | |
| 2013/0285914 | A1 | 10/2013 | Pasuero et al. | |
| 2014/0101553 | A1 | 4/2014 | Nagel | |
| 2014/0173460 | A1 | 6/2014 | Kim | |
| 2014/0181219 | A1* | 6/2014 | Wang | H04L 51/32 |
| | | | | 709/206 |
| 2014/0223372 | A1* | 8/2014 | Dostie | G06F 3/0482 |
| | | | | 715/813 |
| 2015/0012525 | A1* | 1/2015 | Lindsay | G06F 17/30268 |
| | | | | 707/722 |
| 2015/0074575 | A1* | 3/2015 | Jeon | G06F 3/04886 |
| | | | | 715/768 |
| 2015/0113435 | A1 | 4/2015 | Phillips | |
| 2015/0121285 | A1* | 4/2015 | Eleftheriou | G06F 3/04842 |
| | | | | 715/773 |
| 2016/0291822 | A1 | 10/2016 | Ahuja et al. | |
| 2017/0083519 | A1 | 3/2017 | Huang et al. | |
| 2017/0102871 | A1 | 4/2017 | Won | |

OTHER PUBLICATIONS

Singh, Gursimranjeet, "ReBoard: Revolutionary Keyboard", Retrieved on: Aug. 28, 2015 Available at: https://itunes.apple.com/in/app/reboard-revolutionary-keyboard/id984982881?mt=8, 3 pgs.

"OS X Yosemite: Use Dictation Commands to tell your Mac what to do", Published on: Nov. 24, 2014 Available at: https://support.apple.com/en-us/HT203085, 3 pgs.

Heisler, Yoni, "A look at iOS 8's new QuickType feature", Published on: Sep. 17, 2014 Available at: http://www.engadget.com/2014/09/17/a-look-at-ios-8s-new-quicktype-feature/, 9 pgs.

"Thingthing keyboard", Retrieved on: Aug. 28, 2015 Available at: http://www.thingthing.co/, 2 pgs.

Russell, Jon, "Fleksy Adds Deep-Linking to Its Keyboard App, Opening New Revenue Opportunities", Published on: Aug. 13, 2015 Available at: http://techcrunch.com/2015/08/13/fleksy-adds-deep-linking-to-its-keyboard-app-opening-new-revenue-opportunities/, 8 pgs.

"Translate Keyboard Pro", Retrieved on: Aug. 28, 2015 Available at: https://itunes.apple.com/in/app/translate-keyboard-pro/id935348328?mt=8, 3 pgs.

"Slated—Translation Keyboard", Retrieved on: Aug. 28, 2015 Available at: https://itunes.apple.com/in/app/slated-translation-keyboard/id929423549?mt=8, 4 pgs.

Barnegren, Steven, "Translator Keyboard", Published on: Feb. 2, 2015 Available at: https://itunes.apple.com/us/app/translator-keyboard/id890257585?mt=8, 3 pgs.

"Translator Keyboard", Retrieved on: Aug. 28, 2015 Available at: https://play.google.com/store/apps/details?id=com.sparklingapps.translatorkeyboard&hl=en, 3 pgs.

"iOS 8 Preview: The biggest changes to the keyboard since the very first iPhone", Published on: Jun. 14, 2014 Available at: http://www.iphonehacks.com/2014/06/ios-8-preview-quicktype-third-party-keyboards.html, 9 pgs.

Gokey, Malarie, "20 of the hottest iPhone Keyboards: Fleksy's amazing Keyboard is now Free Forever", Published on: Aug. 18, 2015 Available at: www.digitaltrends.com/mobile/ios8-keyboards-confirmed/, 10 pgs.

"Keyboard Commands", Published on: Sep. 27, 2014 Available at: http://mega-voice-command.com/wiki/keyboard.html, 2 pgs.

Shaul, Brandy, "Biziboard Keyboard on iOS Supports Google Image Search without Leaving Conversations", Published on: Mar. 24, 2015 Available at: http://www.adweek.com/socialtimes/biziboard-keyboard-on-ios-supports-google-image-search-without-leaving-conversations/617511, 8 pgs.

"Clips—Copy and Paste anywhere with Widget and Keyboard", Retrieved on: Aug. 28, 2015 Available at: https://itunes.apple.com/in/app/clips-copy-paste-anywhere/id917638056?mt=8, 3 pgs.

"Text Expander for Windows", Retrieved on: Aug. 28, 2015 Available at: http://www.phraseexpress.com/, 4 pgs.

"Get help with your Keyboard on your iPhone, iPad, or iPod Touch", Published on: May 11, 2015 Available at: https://support.apple.com/en-us/HT202178, 5 pgs.

O'Connor, Greg, "How to Activate and use Voice Dictation via the iPad and iPhone Onscreen Keyboard", Published on: Apr. 3, 2012 Available at: http://www.spectronics.com.au/blog/new-technologies/how-to-activate-and-use-voice-dictation-via-the-ipad-and-iphone-onscreen-keyboard/, 6 pgs.

"Sentence Builder App", Retrieved on: Aug. 28, 2015 Available at: https://itunes.apple.com/us/app/sentence-builder-app/id512507120?mt=884ign-mpt=uo%3D8, 2 pgs.

Soffer, Daniel, "Phraseboard Keyboard", Retrieved on: Aug. 28, 2015 Available at: https://itunes.apple.com/in/app/phraseboard-keyboard/id916976066?mt=8, 2 pgs.

"Ginger Software Adds Sentence Rephraser to Android Proofreading Keyboard to Reword Your Written English", Published on: Sep. 16, 2013 Available at: http://www.nebraskadigital.com/2013/09/ginger-software-adds-sentence-rephraser-to-android-proofreading-keyboard-to-reword-your-written-english/, 8 pgs.

"Phone Basics", Available at: http://www.gcflearnfree.org/iphonebasics/6/print, Jul. 14, 2014, 15 pages.

"Make Your Own Keyboard", Available at: http://hot-virtual-keyboard.com/computer-keyboard/, May 9, 2015, 3 pages.

"On Screen Keyboard Projects", Available at: http://www.oatsoft.org/Software/Software/by-category/Repository/Function/OnScreenKeyboards, Oct. 25, 2007, 2 pages.

"Virtual Keyboards", Available at: https://touch-base.com/documentation/Virtual%20Keyboards.htm, May 2, 2015, 7 pages.

Muir, Nancy C., "How to Use the On-Screen Keyboard in Windows 7", Available at: http://www.dummies.com/how-to/content/how-to-use-the-onscreen-keyboard-in-windows-7.html, Oct. 23, 2010, 7 pages.

O'Connor, David, "How to Type & Click When You Can't Use a Mouse or Keyboard", Available at: http://www.makeuseof.com/tag/type-click-cant-use-mouse-keyboard/, Oct. 14, 2015, 11 pages.

Rouse, Margaret, "Soft keyboard (onscreen keyboard or software keyboard)", Available at: mhttp://whatis.techtarget.com/definition/soft-keyboard-onscreen-keyboard-or-software-keyboard,Jul. 2, 2012, 11 pages.

Shegdar, et al., "Intelligent Keyboard for Android Text Editor", In International Journal of Engineering Research & Technology, vol. 4, Issue 2, Feb. 2015, 3 pages.

Weber, Tom, "Onscreenkeys", Available at: http://www.onscreenkeys.com/en-us/details.htm, Dec. 10, 2013, 2 pages.

Yang, et al., "An Intelligent Chinese Phonetic On-Screen Virtual Keyboard System", In Journal of Biomedical Engineering Applications, Basis & Communications, vol. 18, No. 4, Aug. 2006, 7 pages.

Zibreg, Christian, "iOS 8 Translator Keyboard lets you translate text from one language to another", Available at: http://www.idownloadblog.com/2014/10/02/ios-8-translator-keyboard/, Oct. 2, 2014, 10 pages.

PCT International Preliminary Report on Patentability in International Application PCT/US2016/054570, dated Jan. 23, 2018, 8 pgs.

"Final Office Action Issued in U.S. Appl. No. 15/091,687", dated Oct. 2, 2018, 37 Pages.

"Non-Final Office Action Issued in U.S. Appl. No. 15/091,687", dated Apr. 23, 2018, 40 Pages.

"Non Final Office Action Issued in U.S. Appl. No. 15/091,687", dated Jun. 18, 2019, 43 Pages.

* cited by examiner

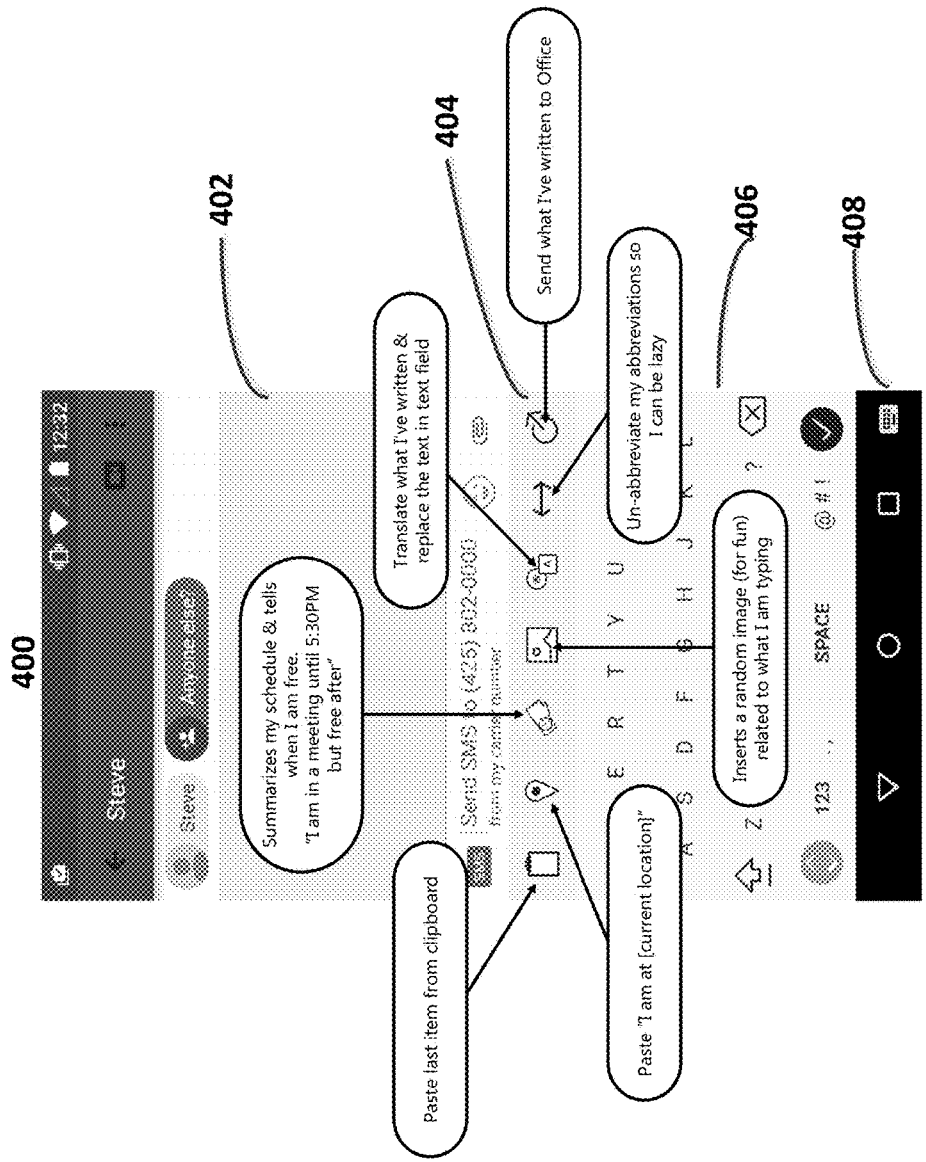

FIG. 4H
470
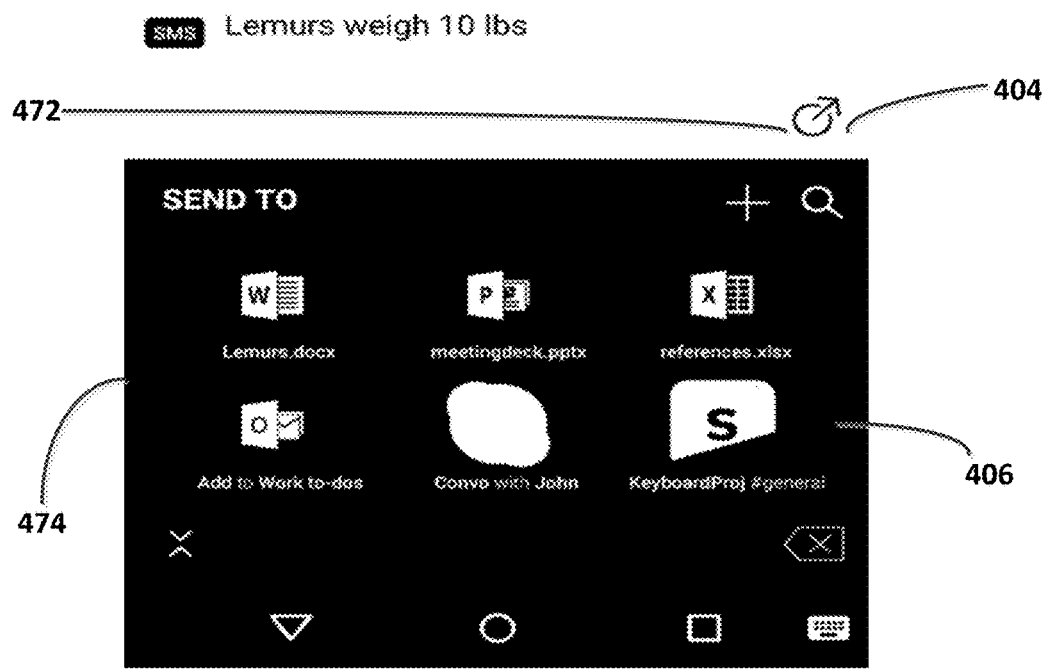

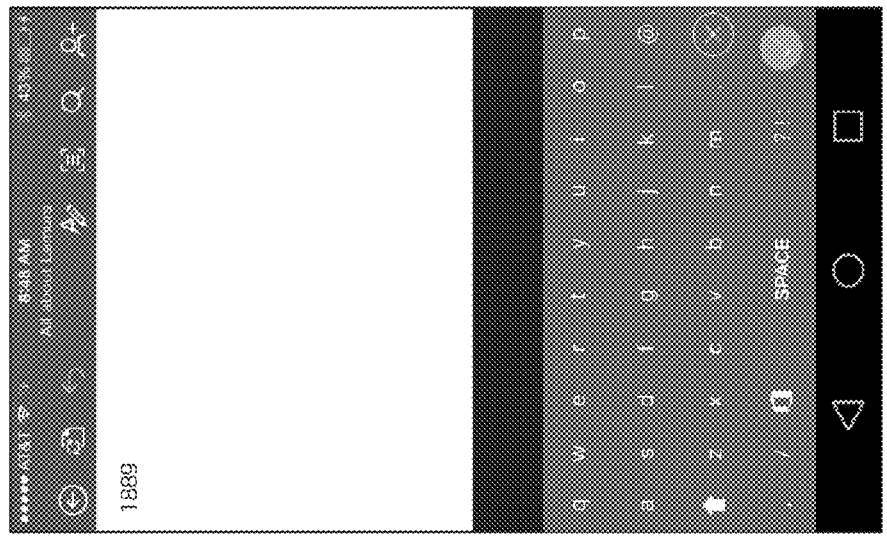
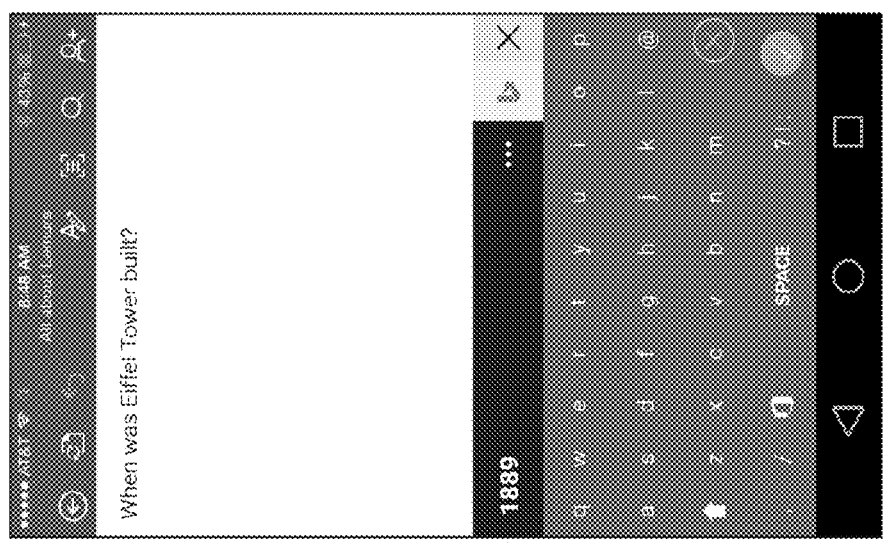
FIG. 7
700

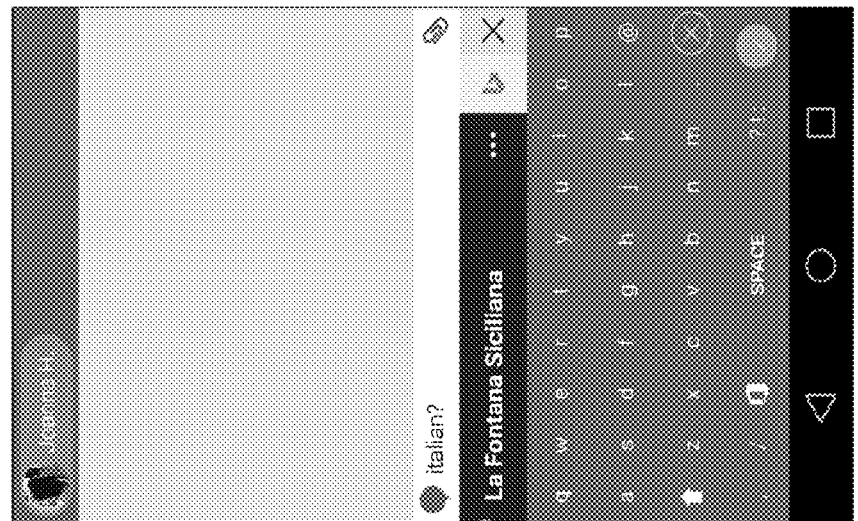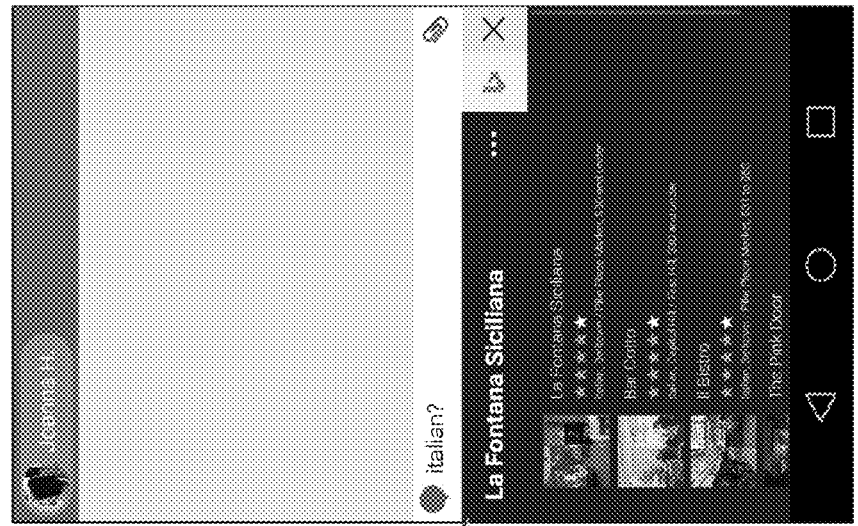
FIG. 8

1400

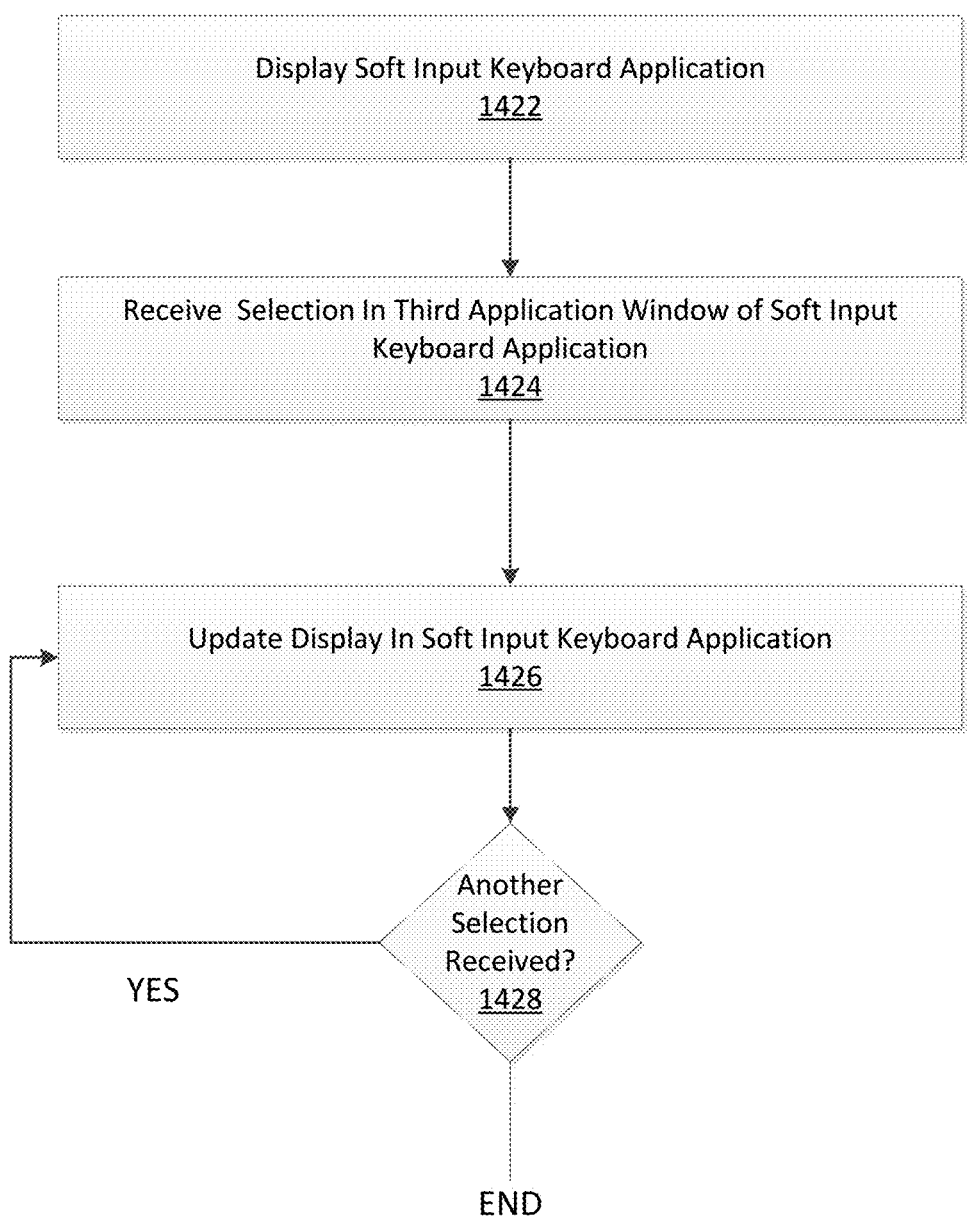

1440

1490

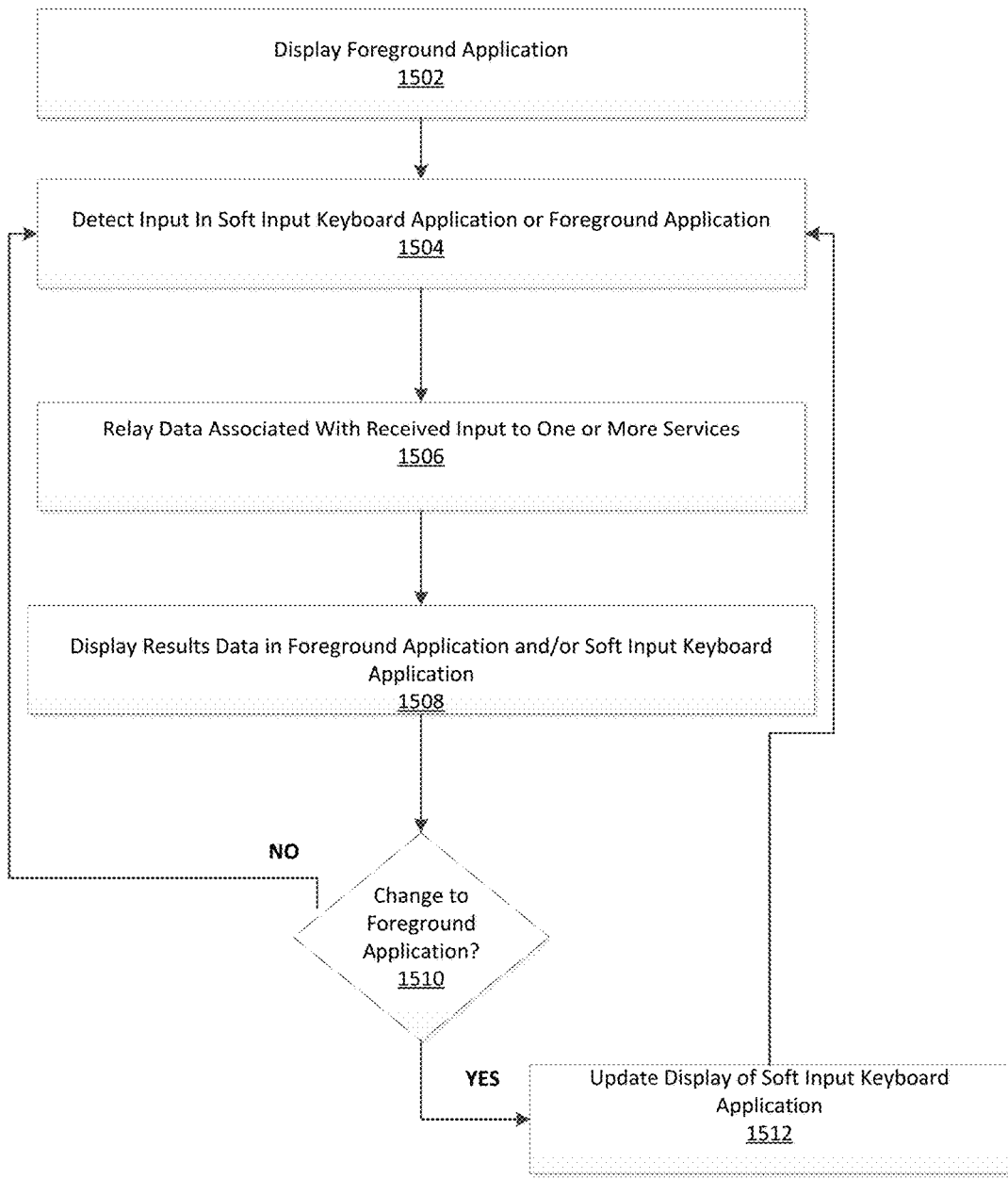

1600

MULTI-WINDOW KEYBOARD

BACKGROUND

Use of processing devices often forces users to switch between applications to transfer information/content from one application to another. For example, multiple operations such as select, copy and paste are required to complete a transfer of information from one application to another. This may create a tedious experience for a user. Furthermore, applications typically lack the ability to communicate with other applications thus further limiting a user experience. As such, it is with respect to the general technical environment of improved application command control that the present application is directed.

SUMMARY

Non-limiting examples of the present disclosure describe systems and methods for a multi-window soft input keyboard application. In an example, a multi-window soft input keyboard application is displayed. The soft input keyboard application is used to provide application command control for one or more other applications. A soft input keyboard application may comprise a first application window that displays two or more user interface elements for services of the soft input keyboard application. In examples, the first application window displays/updates based on the detected foreground application. The user interface elements are usable for application command control of the detected foreground application. An exemplary soft input keyboard application may further comprise a second application window that displays a soft input keyboard. Display of the second application window may update including replacing display of the soft input keyboard based on selection of a user interface element of the first application window.

Additional non-limiting examples of the present disclosure describe systems and methods associated with a multi-window soft input keyboard application that interacts with other executing applications. In examples, a first application operation as a foreground application is displayed. A soft input keyboard application is also displayed. The soft input keyboard application may detect input received into the first application. The soft input keyboard application relays data associated with the input received in the first application to at least one service. Results retrieved from the service are displayed within the soft input keyboard application.

Further, non-limiting examples of the present disclosure describe exemplary systems that may provide a soft input keyboard application as a service. In examples, a soft input keyboard application is displayed. An exemplary soft input keyboard application may comprise a first application window that displays two or more user interface elements for services of the soft input keyboard application. In examples, the first application window updates based on the detected foreground application. The user interface elements are usable for application command control of the detected foreground application. An exemplary soft input keyboard application may further comprise a second application window that displays a soft input keyboard. In examples, display of the second application window is updated by replacing display of the soft input keyboard based on selection of a user interface element of the first application window. Input may be received in at least one of the detected foreground application and the soft input keyboard application. User context signal data collected from the system and data associated with the received input are each transferred to at least one processing device connected with an exemplary system over a distributed network. Received result data may be displayed on the system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 4A illustrates an exemplary processing device view illustrating an interaction between an application and a soft input keyboard application with which aspects of the present disclosure may be practiced.

FIGS. 4B-4H illustrate exemplary processing device views highlighting exemplary user interface elements of an exemplary soft input keyboard application with which aspects of the present disclosure may be practiced.

FIGS. 5-12 illustrate exemplary processing device views highlighting interaction between an application and a soft input keyboard application with which aspects of the present disclosure may be practiced.

FIGS. 14A-14E illustrate exemplary methods involving interaction with an exemplary soft input keyboard application with which aspects of the present disclosure may be practiced.

FIG. 15 is an exemplary method for interacting with one or more foreground applications with which aspects of the present disclosure may be practiced.

DETAILED DESCRIPTION

Figure 1:
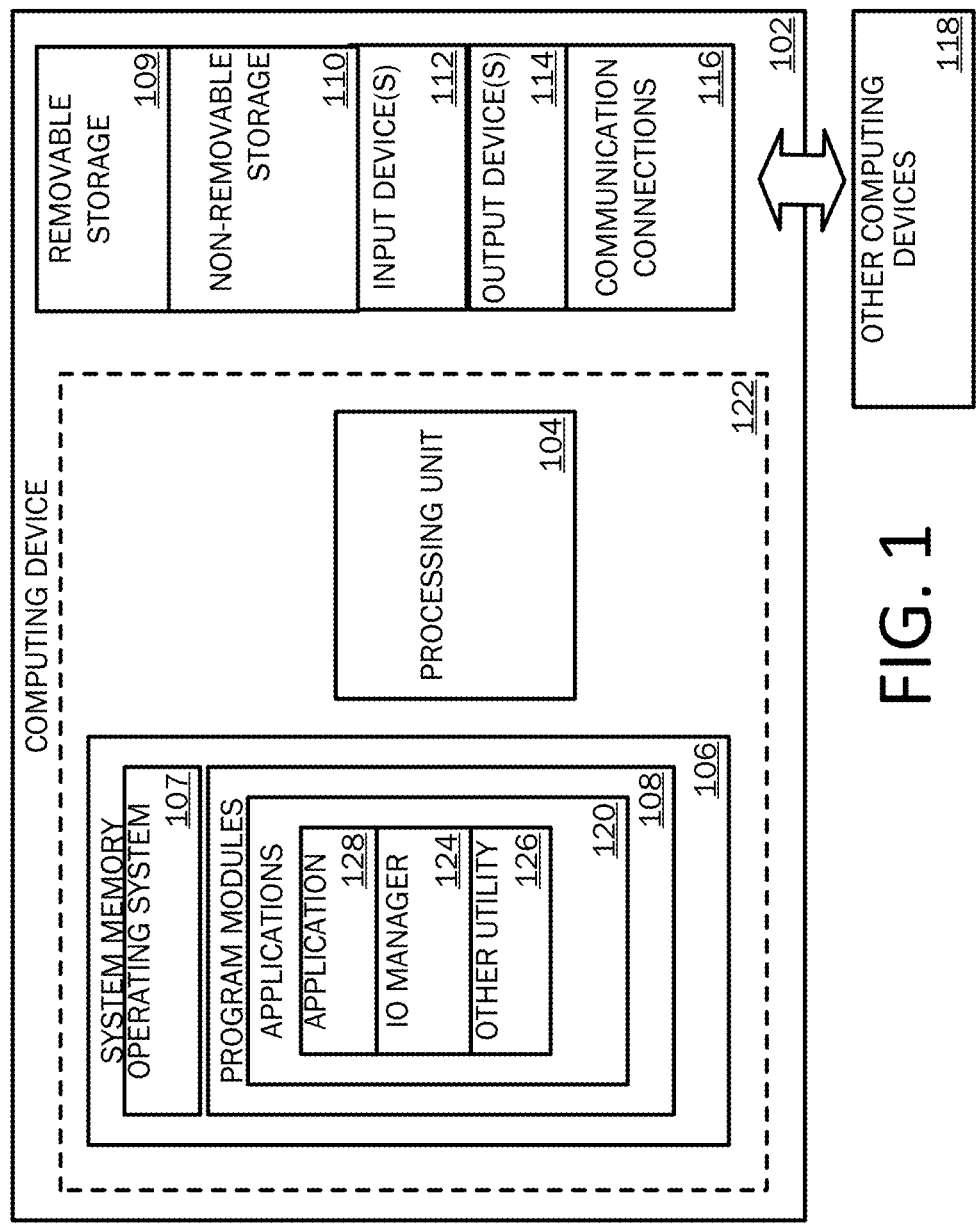
FIG. 1 is a block diagram illustrating an example of a computing device with which aspects of the present disclosure may be practiced.

The present disclosure describes examples of a universal soft input keyboard application that may interface with any application. The soft input keyboard may be a multi-window keyboard application providing application control for any application executing in a foreground of an operating system (OS) running on a processing device. A foreground application is any application that has input focus. As an example a foreground application may be executing and displayed on a display of a processing device. An exemplary soft input keyboard application may communicate with other executing applications (e.g., foreground applications) to improve a user interaction with other applications. Among other examples, the soft input keyboard application may be used to: find answers, locate files, translate data, use features from other applications, receive suggestions/recommendations, improve selection of content with application extensibility, evaluate context of threads within foreground applications and provide auto-completion/auto-insertion of content into such foreground applications, easily transfer data to a foreground application that is obtained from services communicating with the soft input keyboard application without the need to select/copy/paste and provide soft input keyboard functionality, all in one product. In examples, auto-completion features of an exemplary soft input keyboard application are based on user's context (ex. Location, Calendar) and not a generic auto-complete presented in a typical keyboard/soft input panel. One skilled in the art should recognize that exemplary soft input keyboard applications are not limited to the above described actions/features. Further details and examples of exemplary soft input keyboard applications are provided herein.

Often times when using applications, users are restricted to the functionality provided by an application. As such, users typically execute multiple applications simultaneously to accomplish different tasks. For instance, consider a user of a mobile device executing multiple applications. Due to limitations in available display space on a mobile device, a user may be forced to switch back and forth between multiple applications in order to perform tasks. Examples of the present disclosure provide solutions to such technical problems. Accordingly, the present disclosure provides a plurality of technical effects including but not limited to: a scalable and extensible single keyboard application, ability to detect and communicate with other applications, ability to evaluate context of a foreground application including executing threads, reduction of processing load by minimizing the number of applications that need to execute to complete tasks, extensibility to third-party services, improvement in the interaction between a user and a processing device, ability to offer soft input keyboard application as a service, and reduction in the number of applications needed to be stored on a processing device to complete different tasks, among other benefits.

Figure 2A:
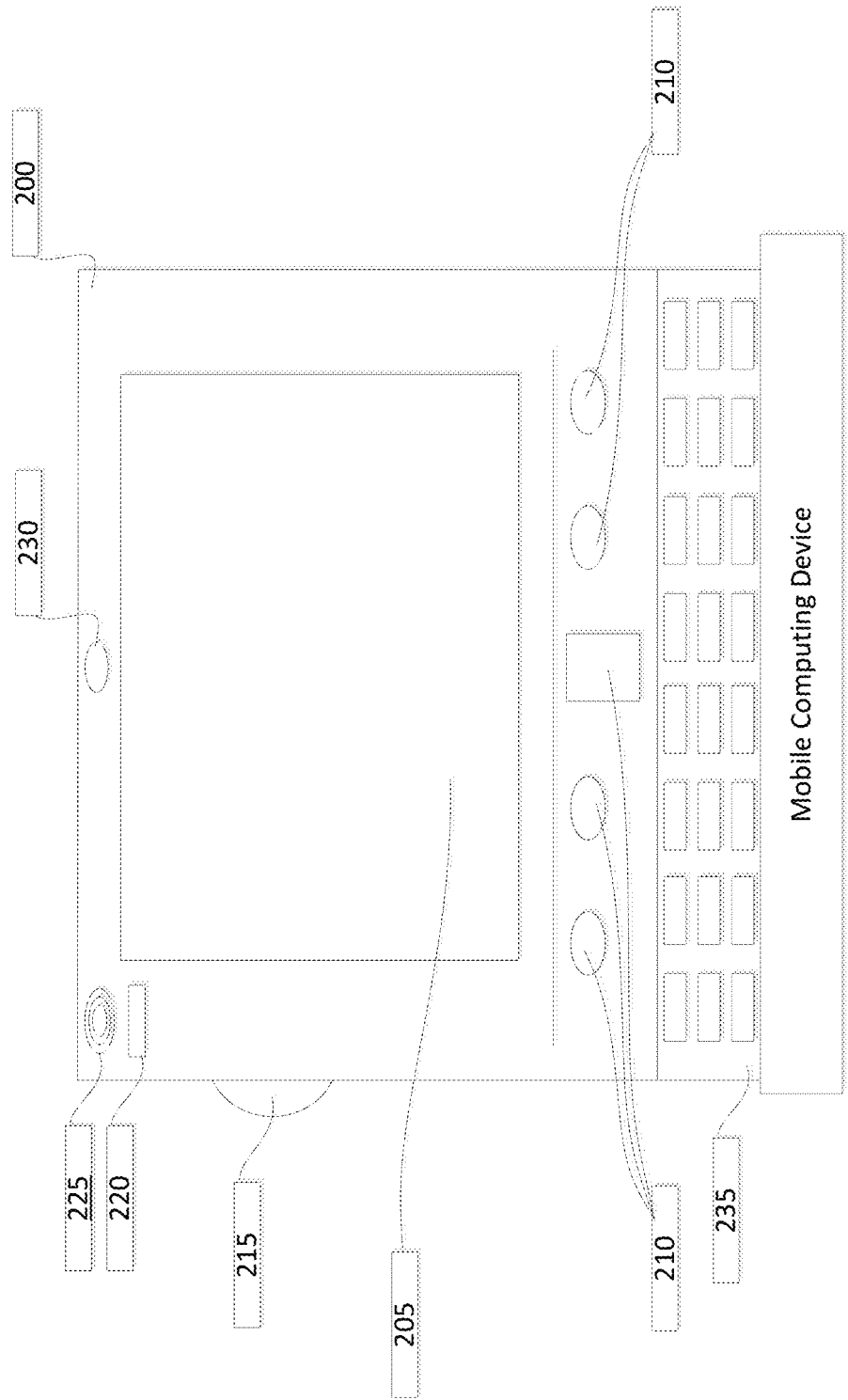
FIGS. 2A and 2B are simplified block diagrams of a mobile computing device with which aspects of the present disclosure may be practiced.
Figure 2B:
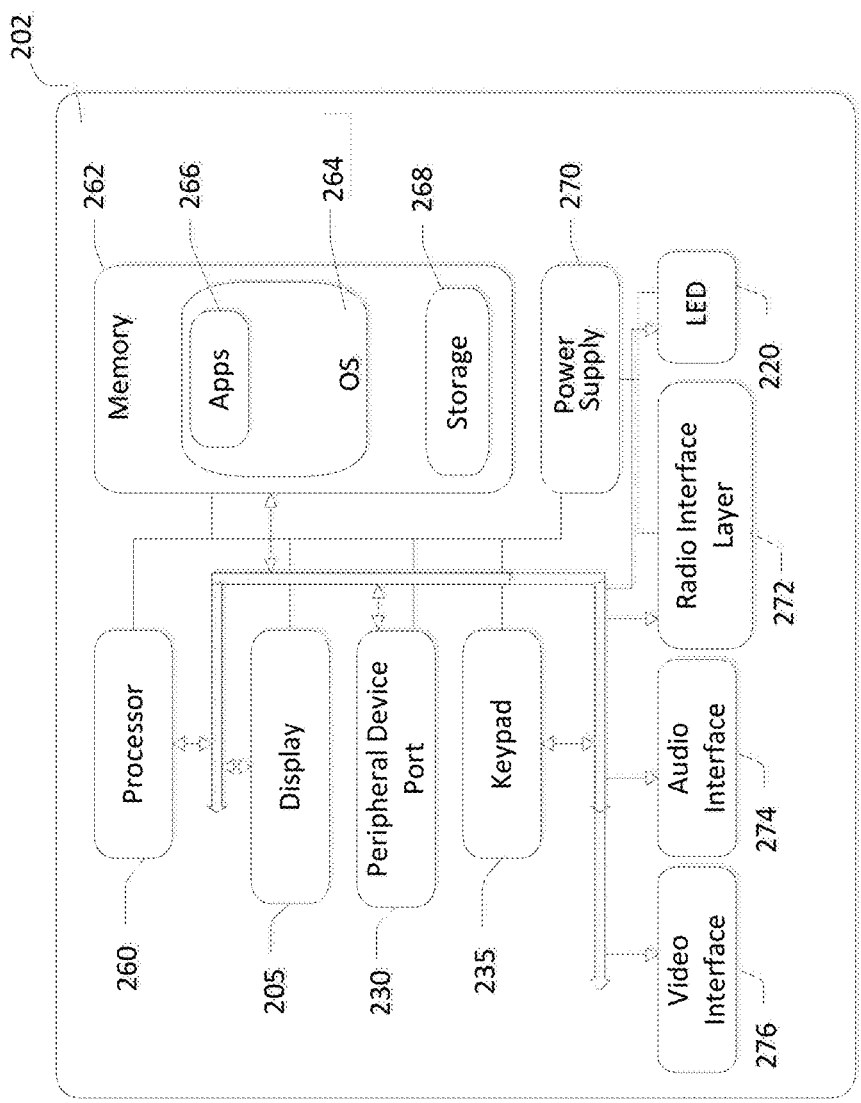
Figure 3:
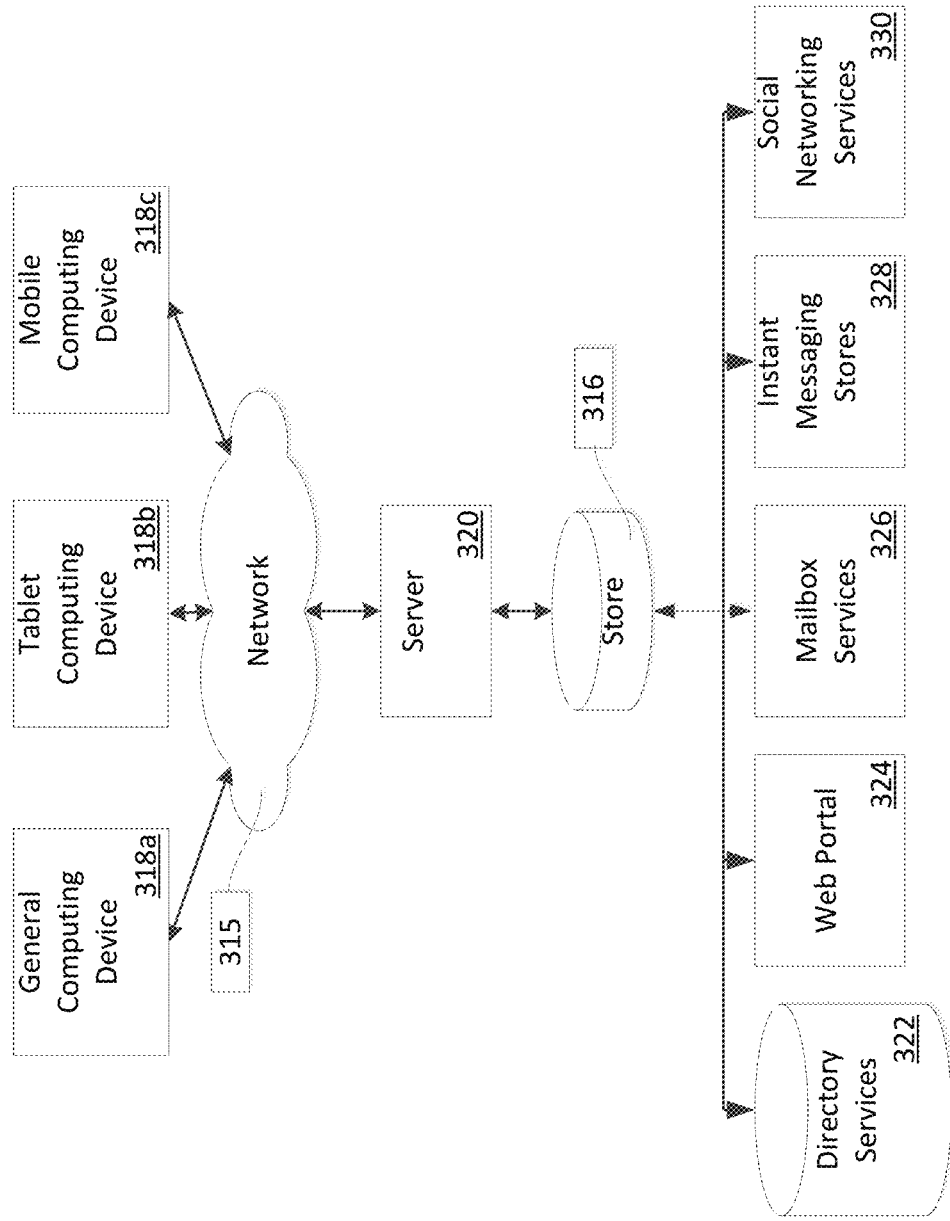
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. For example, mobile computing device 200 may be implemented to execute applications and/or application command control. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

FIG. 4A illustrates an exemplary processing device view 400 illustrating an interaction between an application and a soft input keyboard application with which aspects of the present disclosure may be practiced. The soft input keyboard application is used to provide application command control for one or more other applications. The soft input keyboard application may be generated/executed based on processing operations executed in accordance with one or more application programming interfaces (APIs), or any other collection of processing operations, functions, routines, protocols, and/or tools for building and executing software applications on a processing device. In examples, the soft input keyboard application may comprise two or more application windows that are programmed portions of the soft input keyboard application configured to display content associated with the soft input keyboard application in an organized manner. In one example, the soft input keyboard application may comprise a first application window 404, a second application window 406 and a third application window 408, as described in further detail below. The soft input keyboard application may be operating system independent and can be configured to execute on any processing device.

Layout and display size associated with soft input keyboard application may be set in a form factor manner based on a device upon which the soft input keyboard application is executing. Size (and number) of application windows may vary based on the processing device upon which the soft input keyboard application is executing. Display space for the soft input keyboard application may be customizable by the user. In other examples, display space associated with the soft input keyboard application may be fixed (and programmed into the soft input keyboard application) by developers. One skilled in the art should recognize that the soft input keyboard application may be programmed to organize data in any manner that fits developer specifications for organizing content within application windows.

As shown in display view 400, the soft input keyboard application (illustrated by 404, 406, and 408 collectively in FIG. 4A) may be displayed along with an application canvas 402 of a foreground application. The application canvas 402 is a usable portion of the application that may be manipulated by a user. In the example shown in FIG. 4A, the application canvas 402 is for an SMS application and comprises multiple portions including a field to enter recipients of an SMS message, a field to enter text/images/objects etc., a field to enter phone number/email address etc., among other portions. One skilled in the art should recognize that the application canvas shown in FIG. 4A is just one example and an application canvas 402 may change based on the type of application that is being executed/displayed, for example as a foreground application.

The soft input keyboard application may communicate with a foreground application, for example using programming operations such as one or more APIs, event processing operations/controls/listeners/interfaces, etc. As an example, the soft input keyboard application may detect one or more threads of execution within a foreground application. A thread is running task within a program/application such as a foreground application. The soft input keyboard application may be configured to detect any threads executing within a foreground application. As an example, the soft input keyboard application may detect a current thread executing within a foreground application, where the current thread may be a thread that a user is actively engaging. In one example, an API, processing operation, event control, listener, etc. may be used to detect an input focus within the application canvas 402. However, it should be recognized that processing operations for detection of a current thread are not limited to such an example. In some examples, a user may have more than one thread open. For instance, in an email application or messaging application, a thread may comprise an email/message correspondence between the user and one or more other users. In such an example, a user may switch between active threads. The soft input keyboard application is able to detect change between threads and identify a current thread the user is working with. Furthermore, threads in applications may dynamically change, for example, when new data/content/users are added to a thread. The soft input keyboard application is also able to detect change updates to threads in foreground applications. In examples, a soft input keyboard application may be configured to received signal data from foreground applications, for example to communicate with a foreground application. For instance, the soft input keyboard application may detect a foreground application based on signal data transmitted from a foreground application or the processing device upon which the soft input keyboard application is executing. In other examples, the soft input keyboard application may further detect a current thread of a foreground application/changes to threads of the foreground application based on signal data transmitted from the foreground application to the soft input keyboard application.

In the example shown in FIG. 4A, a current thread within application canvas 402 is an SMS message thread, where a user is establishing a thread to send a message to a contact named "Steve." As shown in FIG. 4A, the soft input keyboard application (collectively 404, 406 and 408) is displayed below the application canvas 402. However, the soft input keyboard application may be adjustable accordingly to a user preference, for example, where size, position, state, etc. of the soft input keyboard application may be manipulated by a user.

The first application window 404 may initially display two or more user interface elements for services external to a detected foreground application. In examples, the first application window 404 may present user interface elements based on a detected foreground application. For instance, the first application window 404 may display user interface elements related to a word processing application in response to detecting that a word processing application is the foreground application. In another example, the user interface elements displayed in the first application window 404 may be different in response to detecting that the foreground application is a messaging application (e.g., email or short message service (SMS)). In other examples, the user interface elements displayed in the first application window 404 may be fixed, for example by a developer of the soft input keyboard application. In such an example, user interface elements may be presented that provide shortcuts to services integrated within the soft input keyboard application. Services (e.g., applications executing on a processing device/system) are any resource that may interface with the soft input keyboard application. Services may include but are not limited to systems, applications/services that may be managed by a same business/organization as the soft input keyboard application as well as resources that are external to a business/organization of the soft input keyboard application. Services may include resources such as web search services, e-mail applications, calendars, device management services, address book services, informational services, etc., as well as services and/or websites that are hosted or controlled by third parties. For example, services may include line-of-business (LOB) management services, customer relationship management (CRM) services, debugging services, accounting services, payroll services, etc. Services may further include other websites and/or applications hosted by third parties such as social media websites; photo sharing websites; video and music streaming websites; search engine websites; sports, news or entertainment websites, and the like. Services may provide robust reporting, analytics, data compilation and/or storage service, etc., whereas some other services that may be integrated within the soft input keyboard application may provide search engines or other access to data and information, images, videos, and the like.

In examples, services do not need to be installed on a client device in order for the soft input keyboard application to access such services. This is a tremendous benefit to a user, who does not need to download, install and manage a plurality of different applications. However, in some examples, services may be installed locally on a client device. As an example, a user may search for a document using the exemplary soft input keyboard. If the client device of the user has an application installed that can open the document, the user can utilize the soft input keyboard to launch the application and view the document. In other examples, the user can utilize the soft input keyboard application to store a document retrieved using the soft input keyboard application as well as provide links to the document even in cases where a client device does not include an application to view the document. While some services may be accessed over a distributed network by the soft input keyboard, other services may be locally stored on a client device. In some examples, the services may be services that are external to the foreground application and provide extensibility and functionality that is not offered by a single application. For instance, the soft input keyboard application may facilitate integration of third-party services to retrieve content, accomplish tasks, etc., that a single application may not be able to complete. In other examples, the soft input keyboard application is able to obtain and insert data into a foreground application faster (e.g., fewer processing operations) than a foreground application may be able to accomplish such a task. In some examples, the soft input keyboard application may be programmed to enable third-party input fields to display within the user interface elements of the soft input keyboard application. This may improve processing efficiency in the exchanges between the soft input keyboard application and third-party services. Further, users may desire to apply application command control from another application to accomplish tasks within a foreground application that might not offer such application command control. For instance, in an example where an SMS application is operating as a foreground application, a user may wish to have editing commands available within a word application or spreadsheet processing application or language translation application among other examples. The soft input keyboard application can facilitate such interaction to improve a user experience while using a foreground application.

In some examples, the user interface elements of the first application window 404 may be searchable, for example through a search input that a user may enter using the soft input keyboard application. An exemplary soft input keyboard application may be configured to receive and process input in any form including but not limited to: text input, audio/voice input, handwritten input, touch input, device/selection input, and among other examples. A soft input keyboard application may have user interface elements programmed within to receive and process input triggered by a user of the soft input keyboard application. In examples, the first application window 404 may be scrollable (for example, horizontally or vertically scrollable) via any type of input (e.g. touch, device, voice command). The soft input keyboard application is configured to enable interaction between not only other applications (e.g., foreground applications) but also facilitates interaction between components of the soft input keyboard application such as the first application window 404, the second application window 406 and the third application window 408. Further description of some of the exemplary user interface elements of the first application window 404 is provided in FIGS. 4B-4H.

An exemplary soft input keyboard application may further comprise a second application window 406 that displays a soft input keyboard, among other content. In examples, the second application window 406 may be scrollable (for example, horizontally or vertically scrollable) via any type of input (e.g. touch, device, voice command). The second application window 406 facilitates interaction between components of the soft input keyboard application such as the first application window 404 and the third application window 408 as well as detected foreground applications. Similar to the first application window 404, display of the second application window 406 is updatable. In one example, display of the second application window may update including replacing display of the soft input keyboard based on selection of a user interface element of the first application window. In such an example, one or more additional user interface elements may be displayed in the second application window 406. The second application window 406 may further be configured to display context of a selected user interface element (e.g., selected within the first application window 404). For example, if a user selects a user interface within the first application window 404, content associated with the selected user interface element may be presented in the second application window 406. In such a way, the user interface elements of the first application window 404 act as a shortcut to functionality and content of a service associated with a user interface element.

Furthermore, the second application window 406 may configured to present content from multiple services with the second application window 406. In this way, the second application window 406 is multi-window itself by enabling streams of content from multiple services to be displayed within the application space of the second application window 406. When it comes to mobile devices, presenting content from multiple services within an application window such as the second application window 406 provides technical advantages from a user interface/user experience perspective where the second application window 406 may be continuously updated with content retrieved from a plurality of different services and/or application command control features.

Moreover, the soft input keyboard (e.g., soft input panel (SIP)) of the second application window 406 may comprise user interface elements such as key types for inputting data into an application, e.g., the foreground application and/or the soft input keyboard application. Some features associated with a soft input keyboard include but are not limited to: alphabetic input keys, alphanumeric input keys, modifier keys, cursory keys, system commands, input recognition commands, commands for first-party services, second-party services, third-party services, insertion commands, and feature commands (e.g. delimiters associated with soft input keyboard application), among other examples. Other standard key types for entering input may be included within the soft input keyboard and are known to one skilled in the art.

An exemplary soft input keyboard application may further comprise a third application window 408 that displays a soft input keyboard, among other content. In examples, the third application window 408 may provide command control for the soft input keyboard application. For instance, the third application window 408 may provide command control including but not limited to: changing a size or state of the soft input keyboard application (e.g., minimized, maximized, closed, larger view/icons, smaller view/icons), command control over application windows including command control to navigate between content within application windows, command control to toggle display of the soft input keyboard, and command control to select and de-select content, among other examples. In examples, the third application window 408 may be scrollable (for example, horizontally or vertically scrollable) via any type of input (e.g. touch, device, voice command). In other examples, the third application window 408 may be fixed and uniformly present the same user interface features despite updates to content in other application windows. The third application window 408 facilitates interaction between components of the soft input keyboard application such as the first application window 404 and the second application window 406 as well as detected foreground applications.

FIGS. 4B-4H illustrate exemplary processing device views highlighting exemplary user interface elements of an exemplary soft input keyboard application with which aspects of the present disclosure may be practiced. FIGS. 4B-4H illustrate exemplary user interface elements that may be provided in an application window such as the first application window 404 described and illustrated with respect to FIG. 4A.

Figure 4B:
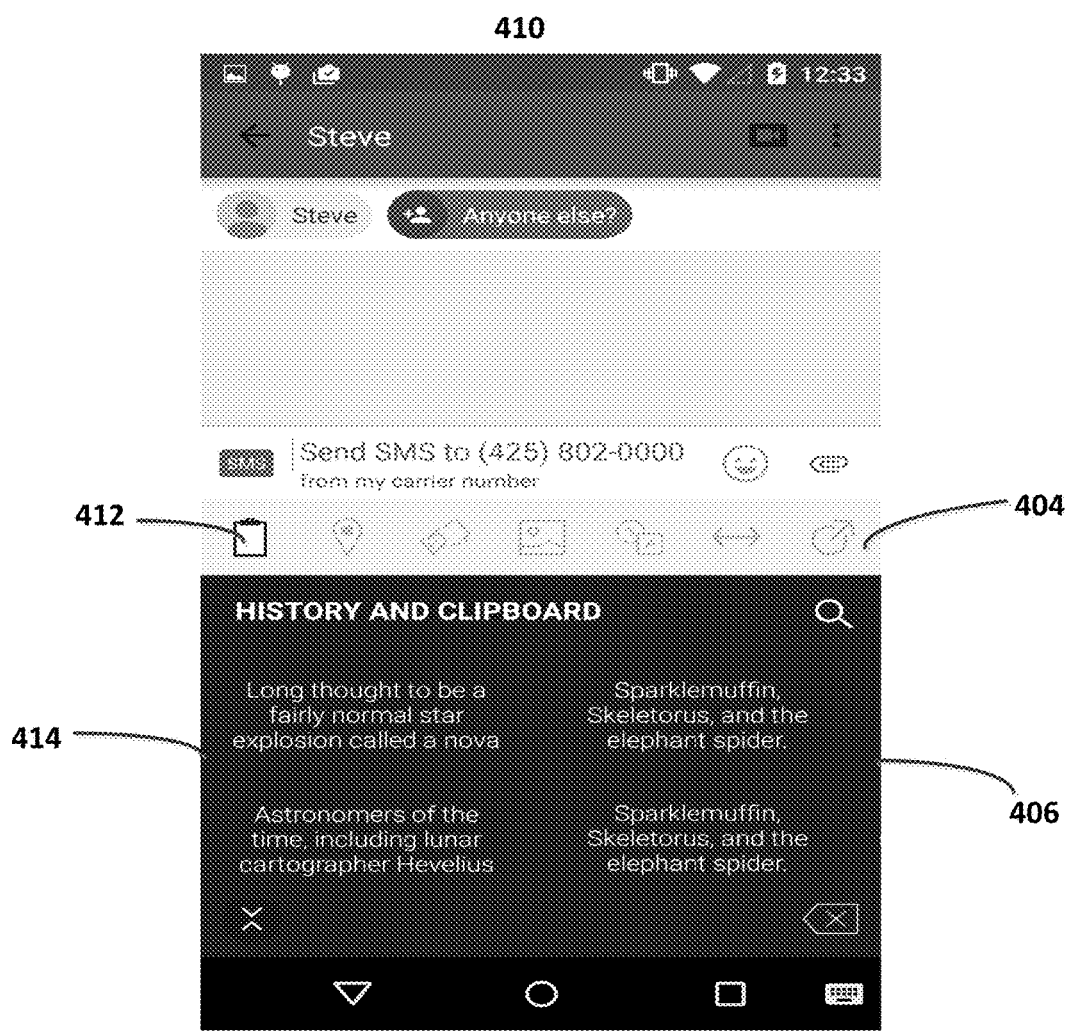

FIG. 4B illustrates an exemplary processing device view 410 highlighting the selection of a user interface element 412 in an exemplary first application window 404. User interface element 412 is shortcut to a service for a history/clipboard service/application. A service associated with user interface element 412 may be used for data storage (e.g., short-term or long-term data storage) and can be configured for transfer of data between applications such as the soft input keyboard application and a foreground application. In examples, data or content may be received from one or more services external to the soft input keyboard application and stored for insertion/manipulation by a user. A user may also select content from within a foreground application and utilize user interface elements 412/414 to store data/content for later use in the foreground application or another application such as a second foreground application. Selection of content and storage in user interface element 412 may be made simpler by actions such as a single tap, click/drag/drop, slide, swipe, etc.

Processing device view 410 illustrates the selection of user interface element 412 in the first application window 404. In response to selection of user interface element 412, display of the second application window 406 may update to display a clipboard service 414 and/or content related to the clipboard service 414. As an example, selection of user interface element 412 results in replacing display of the soft input keyboard with the clipboard service 414. In examples, the soft input keyboard application is configured to receive inputs in various ways. For instance, different types of input can be recognized by the soft input keyboard application, for instance where actions such as tapping an icon/user interface element can be distinguished from pressing/holding operations. In other examples, a force associated with a received input (e.g., pressure applied, tone of voice of a received utterance, etc.) can be utilized to determine intended action.

The soft input keyboard application is programmed to recognize different inputs and take different actions based on a particular recognized input. As an example, a multi-window view of an application/service may be launched in response to a press/hold operation. However, one skilled in the art should recognize that the soft input keyboard application can be programmed or configured where any type of received input can trigger a multi-window view for an application/service. In examples, a user can scroll through the second application window 406 (for example, vertically or horizontally) to view content of the clipboard service 414. In some examples, a user may swipe to change display of content within the second application command control window 406. For instance, different pages of content of the clipboard service 414 may be displayed by swiping. The second application window 406 may be further updated by selection of a user interface element from one of the other application windows such as the first application window 404 and the third application window 408 (described in FIG. 4A).

Figure 4C:
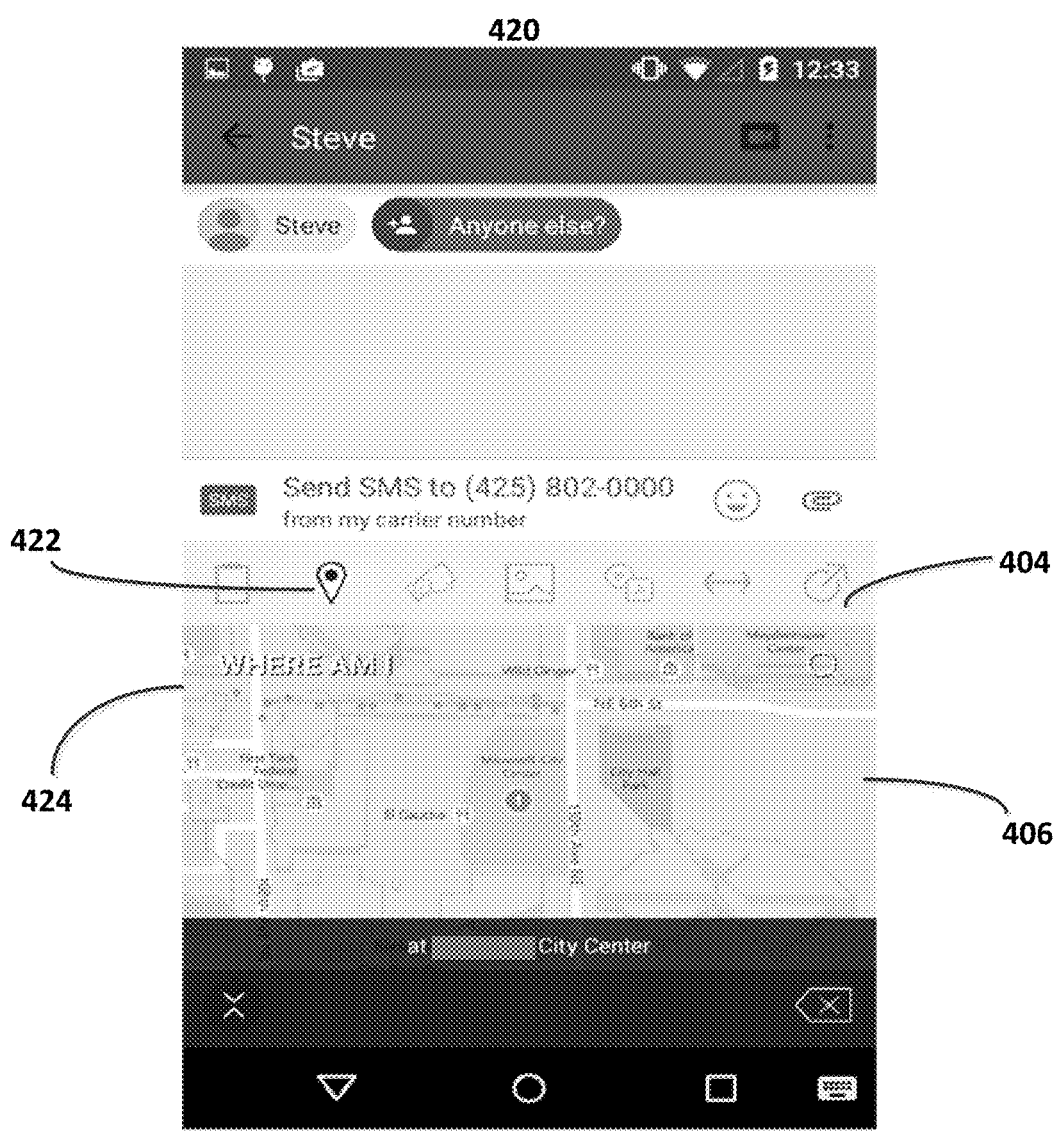

FIG. 4C illustrates an exemplary processing device view 420 highlighting the selection of a user interface element 422 in an exemplary first application window 404. User interface element 422 is shortcut to location/map service 424. A service associated with user interface element 422 may be used to determine a location of a processing device, map areas surrounding the determined location, provide geographic coordinates and associated data, view other geographies/topologies, provide directions, etc. For instance, the location/map service 424 may be programmed and configured to collect user context signals related to location data that may be used to determine an exact location of a processing device. For instance, APIs associated with the location/map service 424 can be programmed to passively collect location data (e.g., signal data) of a processing device and evaluate the collected signal data in comparison with other signal data to determine a precise location of a processing device. In doing so, the location/map service 424 can accurately determine and output an exact location where a user may be located, for example in a living room of a house or a specific building/apartment unit within a location. It is noted collection of such signal data is in compliance with any privacy laws as well as preferences set by a user. The location/snap service 424 may display data related to the location of a processing device/user in the location/map service 424 to enable the user to insert such data into a foreground application. In other examples, the location/map service 424 may be used to lookup location or geographical information such as an address, place name, etc., and insert such data into a foreground application.

Processing device view 420 illustrates the selection of user interface element 422 in the first application window 404. In response to selection of user interface element 422, display of the second application window 406 may update to display a location/map service 424 and/or content related to the location/map service 424. As an example, selection of user interface element 422 results in replacing display of the soft input keyboard with the location/map service 424. In examples, a user can scroll through the second application window 406 (for example, vertically or horizontally) to view content of the location/map service 424. In some examples, a user may swipe to change display of content within the second application command control window 406. For instance, different pages of content of the location/map service 424 may be displayed by swiping. The second application window 406 may be further updated by selection of a user interface element from one of the other application windows such as the first application window 404 and the third application window 408 (described in FIG. 4A).

Figure 4D:
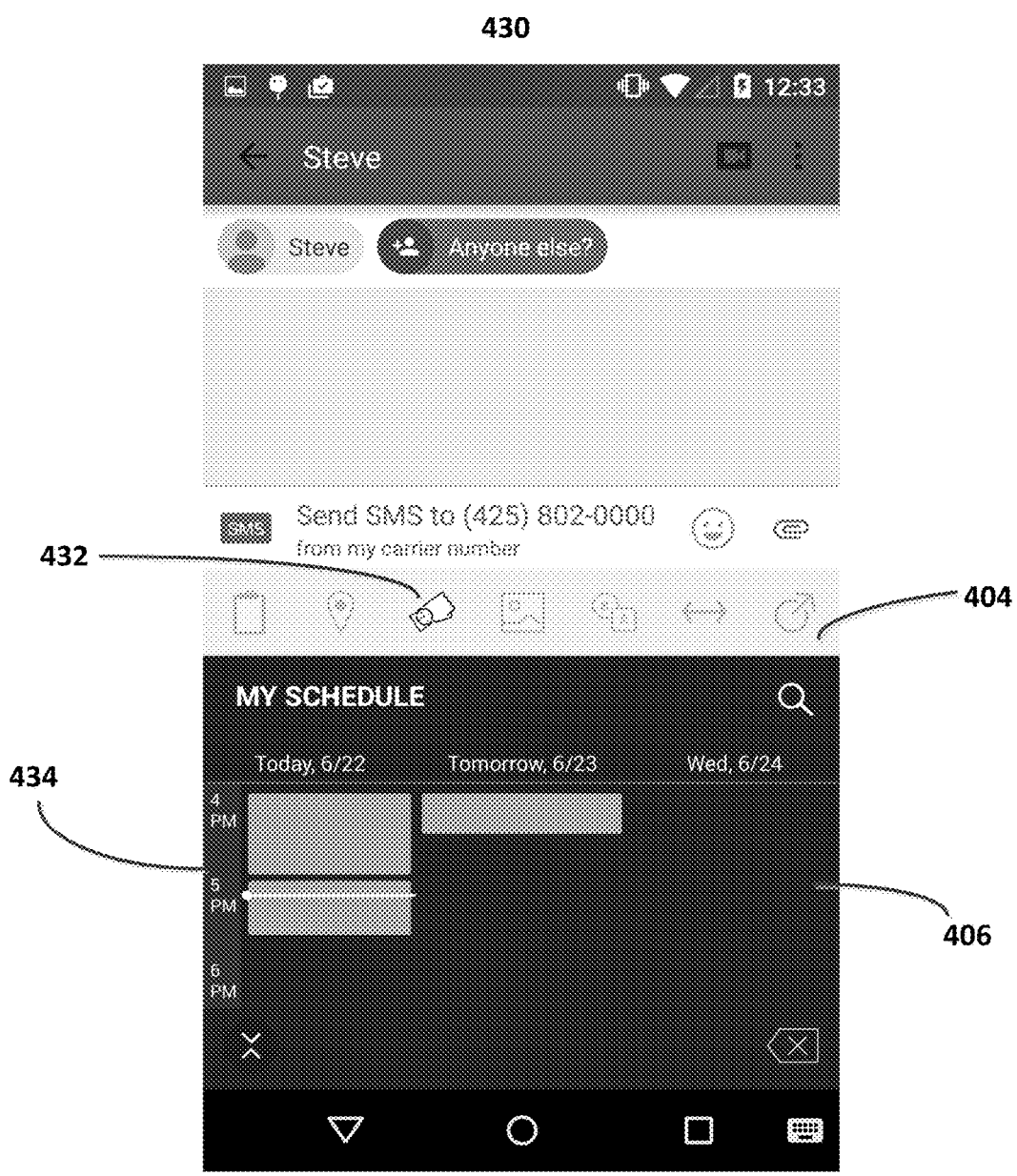

FIG. 4D illustrates an exemplary processing device view 430 highlighting the selection of a user interface element 432 in an exemplary first application window 404. User interface element 432 is shortcut to a calendar/scheduling service 434. The calendar/scheduling service 434 may be used for time-management and provide access to calendars for one or more users/contacts etc. In examples, the calendar/scheduling service 434 may be used to determine availability of one or more users or contacts, for example, users associated with a detected thread in a foreground application. The calendar/scheduling service 434 may be used to access and/or modify calendar or schedule entries. In one example, a user may be entering input into a foreground application such as the SMS application shown in FIG. 4D, where an input may be "Steve, I am available to meet at, . . . " In that example, selection of user interface element 432 may provide access to the calendar/scheduling service 434 as shown in the second application window 406, where free times that the user is next available may be displayed for selection. In other examples, the soft input keyboard application may provide contextual auto-complete for input entered into a foreground application. For example, a user may modify the example input above to something like "Steve, I am available to meet at [next free time]." In that example, the soft input keyboard application is configured to perform processing operations such as: detecting a context associated with the received input, determining an appropriate service to call upon (e.g., calendar application), providing the service with signal data to enable the service to complete a request, and inserting result data retrieved from the service to complete the user request. In the above example, the soft input keyboard application is configured to recognize a trigger such as "[next free time]" and determine a context associated with that trigger. The calendar/scheduling service 434 may be called upon by the soft input keyboard application to identify the next available free time that a user can meet. When the soft input keyboard application receives data for the next available free time, the soft input keyboard application may insert such data in the foreground application (e.g., SMS application). A user can view and/or modify entries in the calendar/scheduling service 434, in the second application window 406, for example.

Processing device view 430 illustrates the selection of user interface element 432 in the first application window 404. In response to selection of user interface element 432, display of the second application window 406 may update to display a calendar/scheduling service 434 and/or content related to the calendar/scheduling service 434. As an example, selection of user interface element 432 results in replacing display of the soft input keyboard with the calendar/scheduling service 434. In examples, a user can scroll through the second application window 406 (for example, vertically or horizontally) to view content of the calendar/scheduling service 434. In some examples, a user may swipe to change display of content within the second application command control window 406. For instance, different pages of content of the calendar/scheduling service 434 may be displayed by swiping. The second application window 406 may be further updated by selection of a user interface element from one of the other application windows such as the first application window 404 and the third application window 408 (described in FIG. 4A).

Figure 4E:
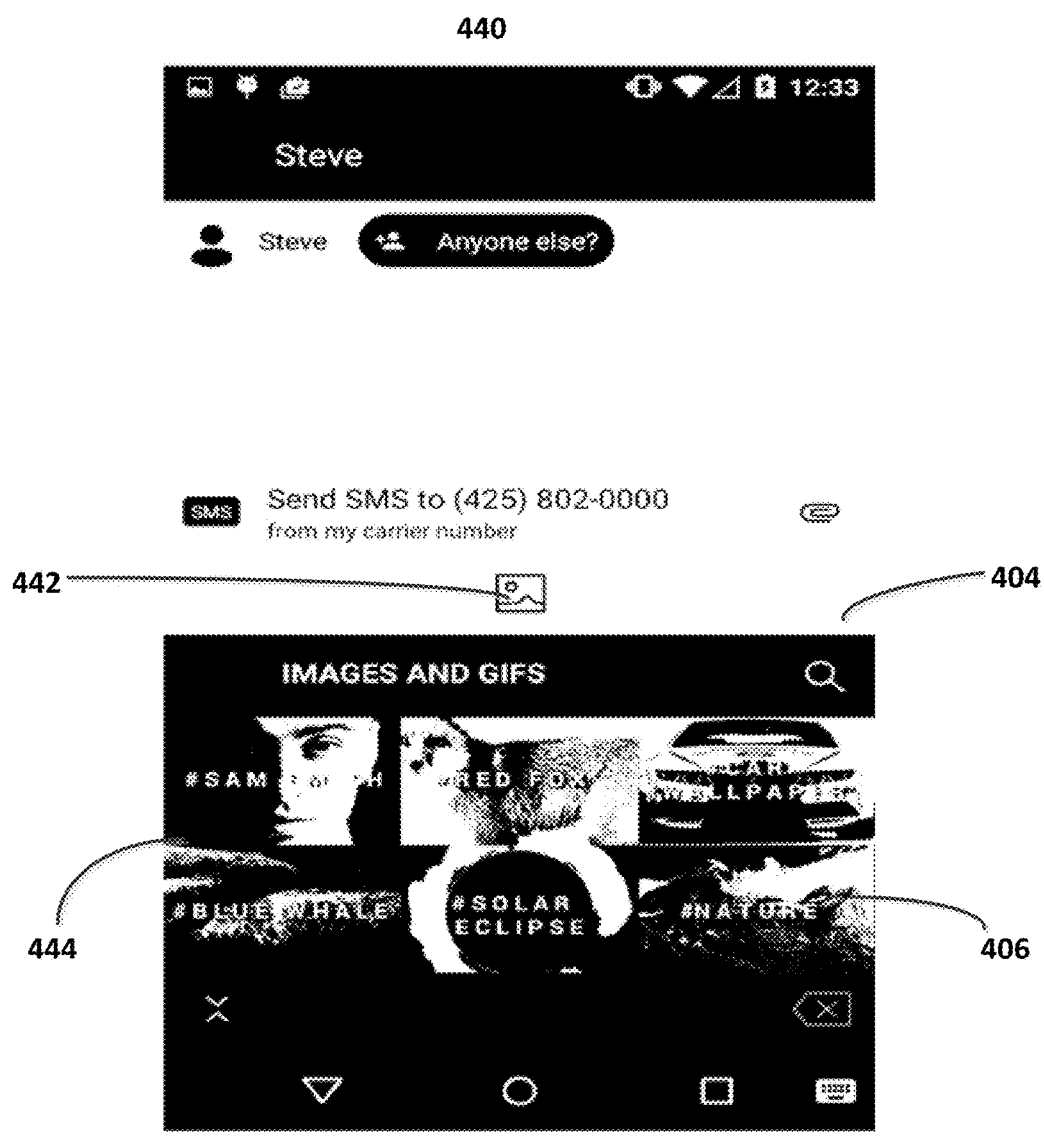

FIG. 4E illustrates an exemplary processing device view 440 highlighting the selection of a user interface element 442 in an exemplary first application window 404. User interface element 442 is shortcut to a search service 444. A service associated with user interface element 442 may be a search service 444. The search service 444 may be used to receive queries, process the queries and evaluate search results data, and return search results data to the soft input keyboard application. In one example, the search service 444 may be a web search engine that interfaces with the soft input keyboard application through a distributed network. The soft input keyboard application may evaluate a context associated with a received input in a foreground application (or within the soft input keyboard application) and transmit the input along with signals for evaluating the context to retrieve results data from the search service 444. As an example, results for a received input (query) may be returned as well as suggested and/or recommended content/ results data based on evaluation of the context by the soft input keyboard application. Results data comprising one or more results may be returned to the soft input keyboard application and displayed in one or more of the application windows including the first application window 404 and the second application window 406.

Processing device view 440 illustrates the selection of user interface element 442 in the first application window 404. In response to selection of user interface element 442, display of the second application window 406 may update to display a search service 444 and/or content related to the search service 444. As an example, selection of user interface element 442 results in replacing display of the soft input keyboard with the search service 444. In examples, a user can scroll through the second application window 406 (for example, vertically or horizontally) to view content of the search service 444. In some examples, a user may swipe to change display of content within the second application command control window 406. For instance, different pages of content of the search service 444 may be displayed by swiping. The second application window 406 may be further updated by selection of a user interface element from one of the other application windows such as the first application window 404 and the third application window 408 (described in FIG. 4A).

Figure 4F:
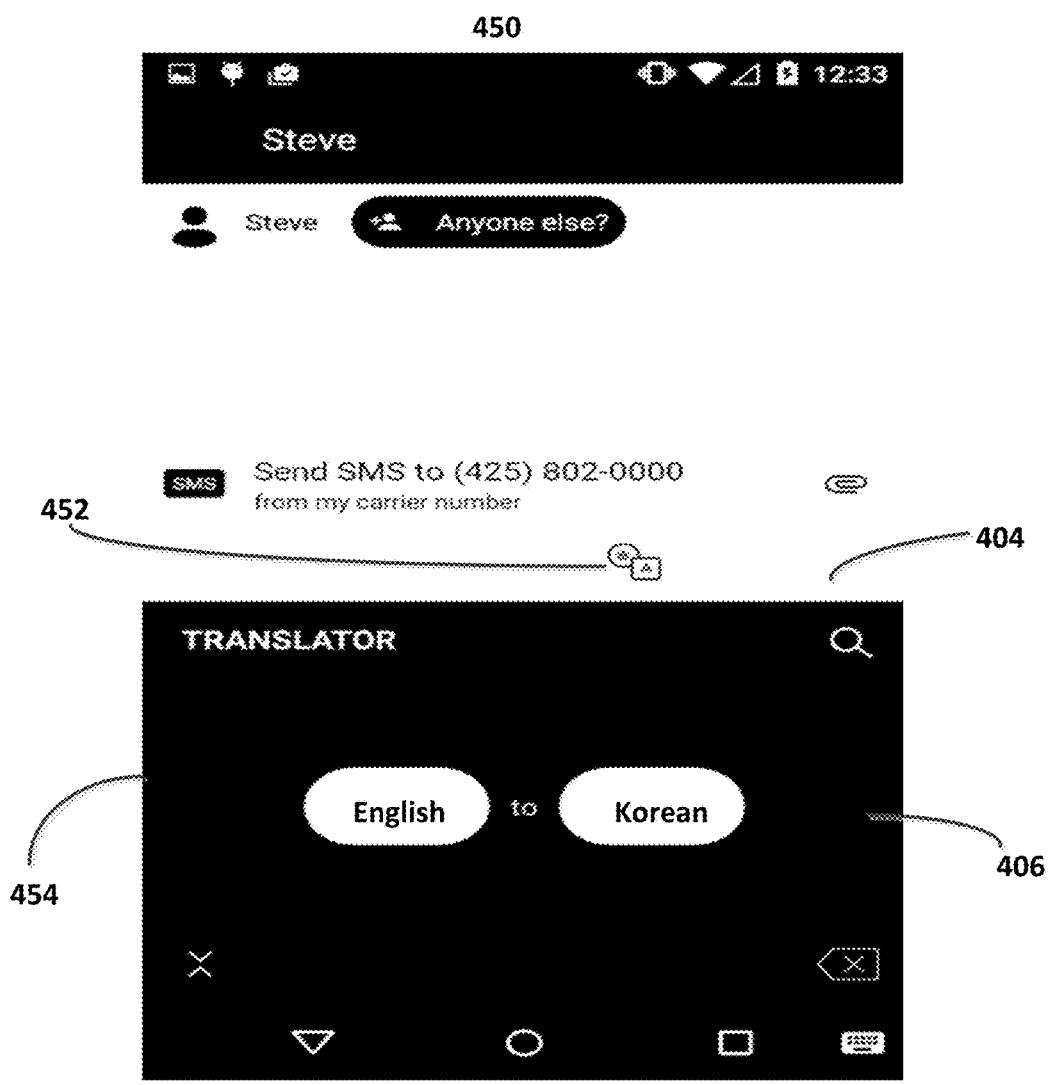

FIG. 4F illustrates an exemplary processing device view 450 highlighting the selection of a user interface element 452 in an exemplary first application window 404. User interface element 452 is shortcut to a translation service 454. The translation service 454 may be used to evaluate and translate input into a foreground application and/or content displayed/retrieved by the soft input keyboard application. Translation service 454 may be a multilingual statistical machine translation service to translate any context including but not limited to: text, speech, images, real-time video, documents into various languages, etc. As an example, a user may enter input into an application canvas of a foreground application and the translation service 454 may be called upon to translate the input into another language, for example.

Processing device view 450 illustrates the selection of user interface element 452 in the first application window 404. In response to selection of user interface element 452, display of the second application window 406 may update to display a translation service 454 and/or content related to the translation service 454. As an example, selection of user interface element 452 results in replacing display of the soft input keyboard with the translation service 454. In examples, a user can scroll through the second application window 406 (for example, vertically or horizontally) to view content of the translation service 454. In some examples, a user may swipe to change display of content within the second application command control window 406. For instance, different pages of content of the translation service 454 may be displayed by swiping. The second application window 406 may be further updated by selection of a user interface element from one of the other application windows such as the first application window 404 and the third application window 408 (described in FIG. 4A).

Figure 4G:
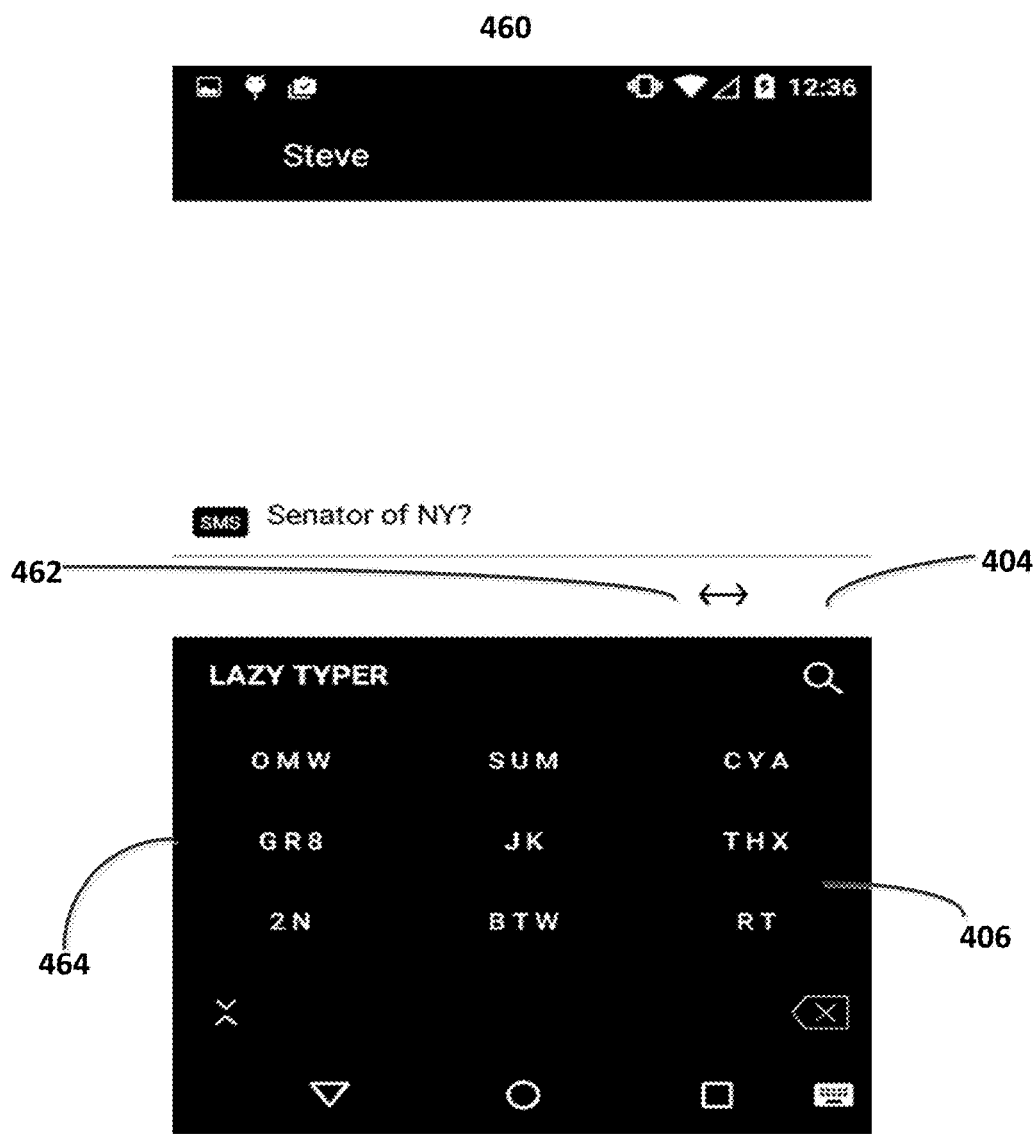

FIG. 4G illustrates an exemplary processing device view 460 highlighting the selection of a user interface element 462 in an exemplary first application window 404. User interface element 462 is shortcut to a lazy typer service 464. The lazy typer service 464 may be used to convert or manipulate shorthand or abbreviations entered in an input for a longer version of a word/phrase/command. As an example, a user may enter an abbreviation of "NY" to mean "New York" instead of typing out the words 'New York." In another example, a user might wish to enter a shorthand/ abbreviation (LOL) for the phrase "laugh out loud." The lazy typer service 464 may be used to detect such abbreviations and offer/complete the abbreviations for the user. For instance, if a user typed "NY", the soft input keyboard application, which is evaluating a thread in a foreground application, can call on the lazy typer service 464 to provide an auto-complete option or suggestion/recommendation to input in an input field of a foreground application. A user may also manually call upon the lazy typer service 464 through selection of user interface element 462, which displays the lazy typer service 464 in the second application window 406. The user may utilize the lazy typer service 464 to enter abbreviations words, etc. into an input field of a foreground application. In some examples, the lazy typer service 464 may programmatically update in accordance with a user preferences. For example, processing operations may be applied to determine most frequently used abbreviations and display them with priority for a user. The lazy typer service 464 may include several thousand abbreviations and dynamically update a library to prioritize such abbreviations based on user preference, usage (e.g., types of abbreviations may different per person and/or language), etc. In examples, the lazy typer service 464 may further be searchable for a user to identify, mark and use abbreviations, among other examples.

Processing device view 460 illustrates the selection of user interface element 462 in the first application window 404. In response to selection of user interface element 462, display of the second application window 406 may update to display a lazy typer service 464 and/or content related to the lazy typer service 464. As an example, selection of user interface element 462 results in replacing display of the soft input keyboard with the lazy typer service 464. In examples, a user can scroll through the second application window 406 (for example, vertically or horizontally) to view content of the lazy typer service 464. In some examples, a user may swipe to change display of content within the second application command control window 406. For instance, different pages of content of the lazy typer service 464 may be displayed by swiping. The second application window 406 may be further updated by selection of a user interface element from one of the other application windows such as the first application window 404 and the third application window 408 (described in FIG. 4A).

FIG. 4H illustrates an exemplary processing device view 470 highlighting the selection of a user interface element 472 in an exemplary first application window 404. User interface element 472 is shortcut to a linking service 474. The linking service 474 may be used to identify content that may be associated with a received input or alternatively identify additional resources, applications, services that a user can connect too. In examples, the linking service 474 may further be searchable for a user to search and evaluate documents, files, applications/services, etc. In some examples, when a user selects/highlights/hovers over an item/element within the display of the linking service 474, summary details regarding the document may be displayed for the user. As an example, an input received in a foreground may "lemurs weight 10 lbs," where selection of a user interface element 472 triggers display of the linking service 474 in the second application window 406. In that example, if a user hovers over a displayed item/document/file, context indicating relevance of the document may be displayed for the user. In other examples, the linking service 474 may be used to identify other applications/services to which to transmit data. In previous examples of transferring content, a user would have to select a portion of a received input, copy it, locate and open another application, and paste the input into that application. The linking service 474 provides a technical advantage by presenting a searchable list of applications/services to which the user can transmit content. As an example, selection of a service (e.g., by user interface element) in the linking service 474 may automatically initiate transfer of data to the selected application/service. In the example above, an input of "lemurs weight 10 lbs," which is included in an SMS thread to a contact "Steve," may be added to a presentation document, a conversation with another user (e.g., "Convo with John"), a to-do list, etc.

Processing device view 470 illustrates the selection of user interface element 472 in the first application window 404. In response to selection of user interface element 472, display of the second application window 406 may update to display a linking service 474 and/or content related to the linking service 474. As an example, selection of user interface element 472 results in replacing display of the soft input keyboard with the linking service 474. In examples, a user can scroll through the second application window 406 (for example, vertically or horizontally) to view content of the linking service 474. In some examples, a user may swipe to change display of content within the second application command control window 406. For instance, different pages of content of the linking service 474 may be displayed by swiping. The second application window 406 may be further updated by selection of a user interface element from one of the other application windows such as the first application window 404 and the third application window 408 (described in FIG. 4A).

FIGS. 5-12 illustrate exemplary processing device views highlighting interaction between an application and a soft input keyboard application with which aspects of the present disclosure may be practiced. FIGS. 5-12 highlight the interactions between the soft input keyboard application and at least one foreground application as referenced above in FIGS. 4A-4H.

Figure 5:
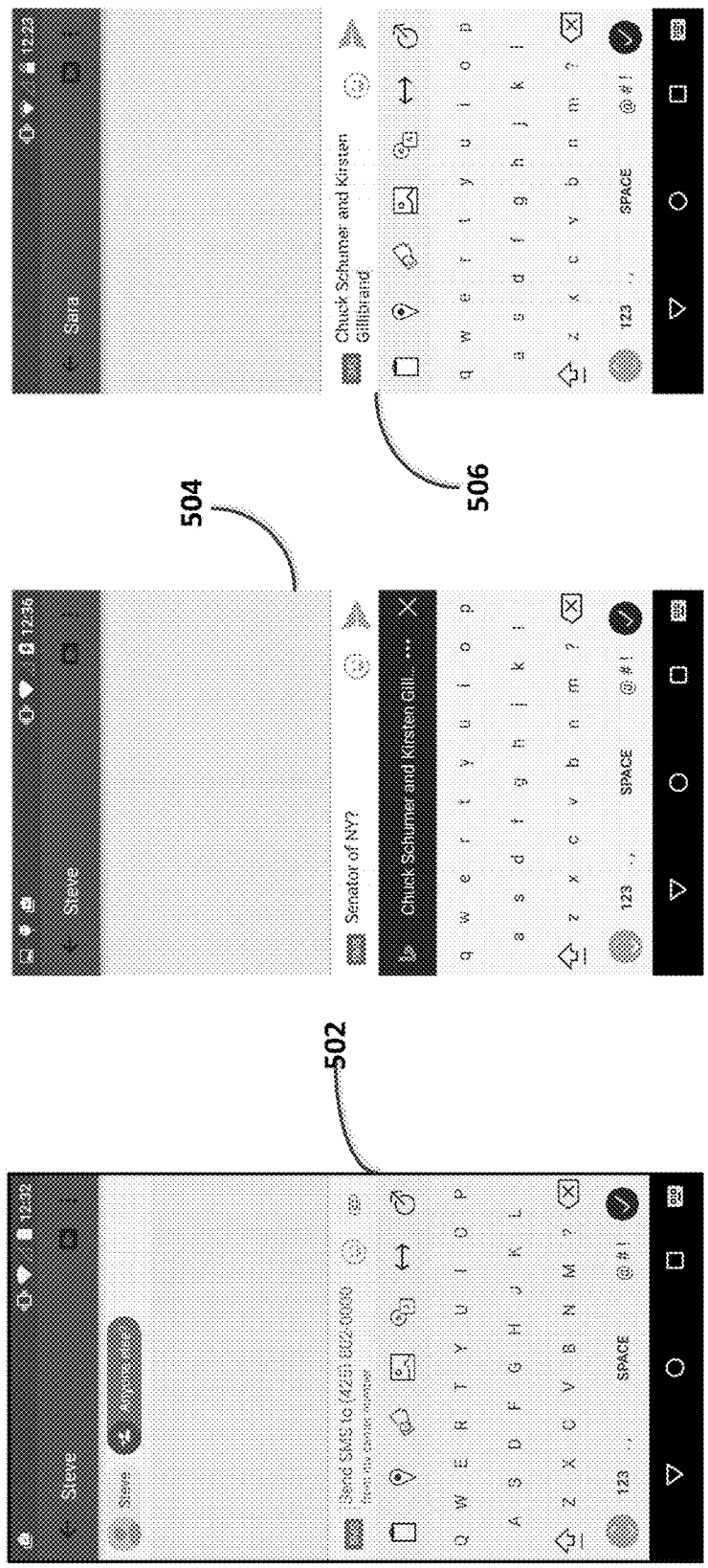

FIG. 5 illustrates processing device views 502-506 that highlight an interaction between a foreground application and soft input keyboard application that interfaces with a plurality of services. Processing device view 502 illustrates display of an executing foreground application (e.g., SMS application) and an executing soft input keyboard application. In processing device view 504, an input of "Senator of NY?" is entered into an input field of the foreground application. An exemplary soft input keyboard application detects and evaluates a context associated with the input into the foreground application. The soft input keyboard application may determine an application/service to contact to retrieve results data for the received input. As an example, the soft input keyboard application may apply processing operations to evaluate a context of the input and determine that a search service is best suited to return results for the user input in the foreground application. In response, the soft input keyboard application may transmit data to the application/service to retrieve results data. Results data returned from the service may be provided to the soft input keyboard application. The soft input keyboard application may update display of an application window (e.g. first application window 404 shown and described in FIGS. 4A-4H) to show result data retrieved from a service such as a search service. Processing device view 504 illustrates that results data "Chuck Schumer and Kirsten Gill . . . " in a first application window. Processing device view 506 illustrates a result of a user selecting the results data from an application window of the soft input keyboard application. As shown in processing device view 506, results data of "Chuck Schumer and Kirsten Gillibrand" is inserted into the input field of the foreground application (replacing the original query of "Senator of NY?" Selection of content within the soft input keyboard application may occur through any type of action including a single tap action or drag action (touch or device input), and voice command, among other examples.

Figure 6:
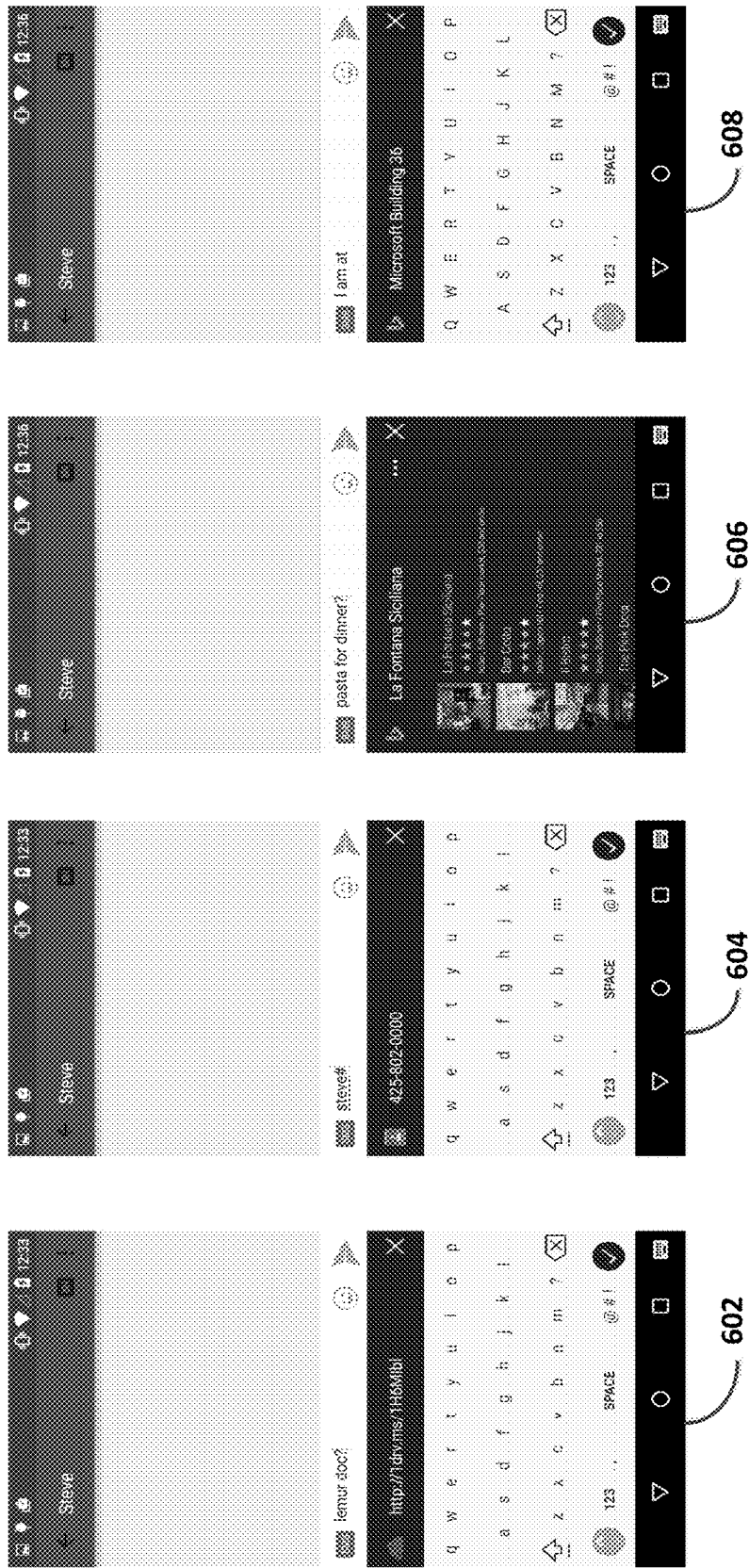

FIG. 6 illustrates processing device views 602-608 highlighting an interaction between a foreground application and soft input keyboard application that interfaces with a plurality of services. In exemplary processing device views 602-608, results data is returned and displayed in an application window (e.g., first application window 404 described in FIGS. 4A-4H) in response to an input into a foreground application. Processing device views 602-608 illustrate the extensibility of an exemplary soft input keyboard application, where results of a plurality of different services may interface with a keyboard application to provide contextually relevant results to an input received in another application (e.g., foreground application).

Processing device view 602 illustrates entry of input into a foreground application (e.g., SMS application), where an input is "lemur doc." The soft input keyboard application may detect entry of input into the foreground application and evaluate a service that may be appropriate to satisfy a user intent associated with a received input. In this example, the soft input keyboard application may use a linking service (e.g., linking service 474 described in FIG. 4H) to retrieve results data such as a link to a document named "lemur.doc." In examples, a user may select to insert this document the link to the "lemur.doc" into a foreground application. In examples, the user may desire to select a different document link from that which is displayed in an application window of the soft input keyboard application. In such an example, the user may utilize the graphical user interface of the soft input keyboard to navigate to a listing of documents/applications/services etc. provided by the linking service.

Processing device view 604 illustrates one example of entry of input into a foreground application (e.g. SMS application), where an input is "Steve#." The soft input keyboard application may detect entry of input into the foreground application and evaluate a service that may be appropriate to satisfy a user intent associated with a received input. In analyzing a context of a received input, the soft input keyboard application may be programmed to detect input such as delimiters. A delimiter may be a trigger for specific command processing by the soft input keyboard application. A number of delimiters may be pre-defined for use within the soft input keyboard application, for example where the soft input keyboard application recognizes a plurality of different predefined delimiters. Further, delimiters may be user-defined (e.g., by repeated user input) or defined by other applications/services such as third-party services. For instance, the soft input keyboard application is extensible to interface with third-party services to recognize third-party specific delimiters. Third-party specific delimiters may be used by the soft input keyboard application to trigger third-party services for results retrieval. Furthermore, delimiters may be searchable by users of the soft input keyboard application.

Turning back to the received input of "Steve#" in processing device view 604, the soft input keyboard application may use a contact service/address book service to retrieve results data such as a phone number for a contact named "Steve" associated with a user contact list or address book." In examples, a user may select to insert the phone number for a contact named "Steve" into a foreground application. In examples, the user may desire to find a different contact number for "Steve" for example where a personal phone number may be displayed but the user is searching for a work phone number. In such an example, the user may utilize the graphical user interface of the soft input keyboard to navigate to a contact/address book service through the soft input keyboard application.

Processing device view 606 illustrates entry of input into a foreground application (e.g., SMS application), where an input is "pasta for dinner." The soft input keyboard application may detect an input received in the foreground application and return results such as restaurants (e.g., Italian restaurants, recipes, stores to purchase ingredients, etc. In examples, the user may desire to select to view more information related to the results data provided in the second application window of the soft input keyboard. For instance, the user may select a specific portion of content such as a restaurant or scroll/swipe through different results data content displayed in the second application window. Selected content may be inserted by the user into an input field of the foreground application.

Processing device view 608 illustrates an example of contextual auto-complete described above. As an example, a user may enter an input of "I am at." The soft input keyboard application may detect this input and utilize processing operations to identify a location where the processing device/user is located at, for example "Building 36." A user may select to enter such content in an input field of the foreground application. As an example, such an input may be a link for the recipient to open a map application and view the location or directions to the location, among other examples. Other exemplary use cases for contextual auto-complete include but are not limited to: I am free at [time I am free at based on my calendar], the time right now is [system time], I am at the meeting [current meeting info], and distance to you is [get distance & travel time from a map service from me to you], among other examples.

FIG. 7 illustrates processing device views 702-704 that highlight an interaction between a foreground application and soft input keyboard application. In processing device view 702, the soft input keyboard application detects entry of an input such as "When was Eiffel Tower built?" In response, the soft input keyboard application evaluates the received input, determines a service that may satisfy intent of a received input, and communicates with the service to obtain results data. In this example, processing device view 702 illustrates that a result data of "1889" is obtained from a search service and displayed in a first application window (e.g., first application window 404 of FIGS. 4A-4H) of the soft input keyboard application. Processing device view 704 illustrates transfer of the results data from the soft input keyboard application to an application canvas of the foreground application. In response to user selection of the results data in the soft input keyboard application, the soft input keyboard application sends the results data for display to the foreground application.

FIG. 8 illustrates processing device views 802-804 that highlight an interaction between a foreground application and soft input keyboard application. As shown in processing device view 802, a user may enter an input of "Italian" into an input field of a foreground application. In response, the soft input keyboard application may programmatically detect that an input is entered, identify a service to return results data, obtain and display the results data in an application window of the soft input keyboard application. As shown in processing device view 804, a user may select to view additional information provided by a service such as search service, whereby selecting a user interface element (e.g., " . . . ") triggers update to display of the second application window of the soft input keyboard application. As shown in processing device view 804, results data/content replaces display of the soft input keyboard previously displayed in the second application window (as shown in processing device view 802).

Figure 9:
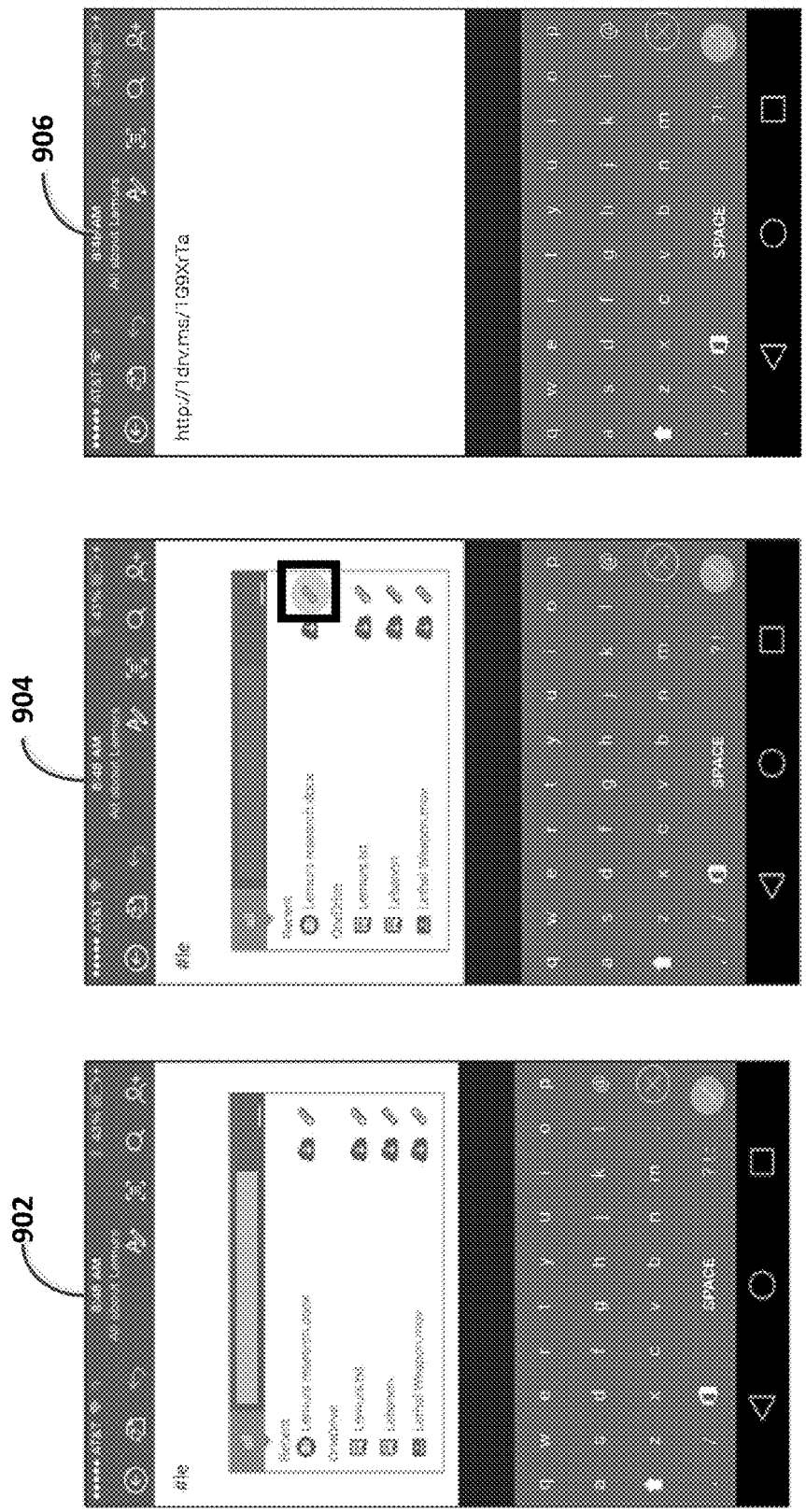

FIG. 9 illustrates processing device views 902-906 that highlight an interaction between a foreground application and soft input keyboard application. Processing device view 902 illustrates entry of a delimiter command (e.g., #) into an application canvas of a foreground application. The soft input keyboard application may detect entry of the delimiter command, evaluate and process the delimiter command and context associated with the delimiter command. That is, the delimiter command may act as a trigger for a specific type of processing by the soft input keyboard application. As one example, in response to detection of a delimiter command such as "#" the soft input keyboard application may launch a service displaying a listing of documents associated with an entered input (e.g., the characters, words, phrases following the entered delimiter command). A document repository service or listing service may provide a listing of documents, files, etc. that may be stored locally as well as over a distributed network or third-party service. For example, a listing of documents associated with an input of "le" may be displayed. In examples, the listing may be displayed within the soft input keyboard application windows or as a pop-out that temporarily displays over an application canvas of a foreground application. However, one skilled in the art should recognize that other user interface effects can be utilized to display a document listing service or any listing of content. As shown in processing device view 904, a link to a recent document of "Lemurs research.docx" is selected. In response to selection of the link as shown in processing device view 904, the document link may be inserted into an application canvas of a foreground application as shown in processing device view 906.

Figure 10:
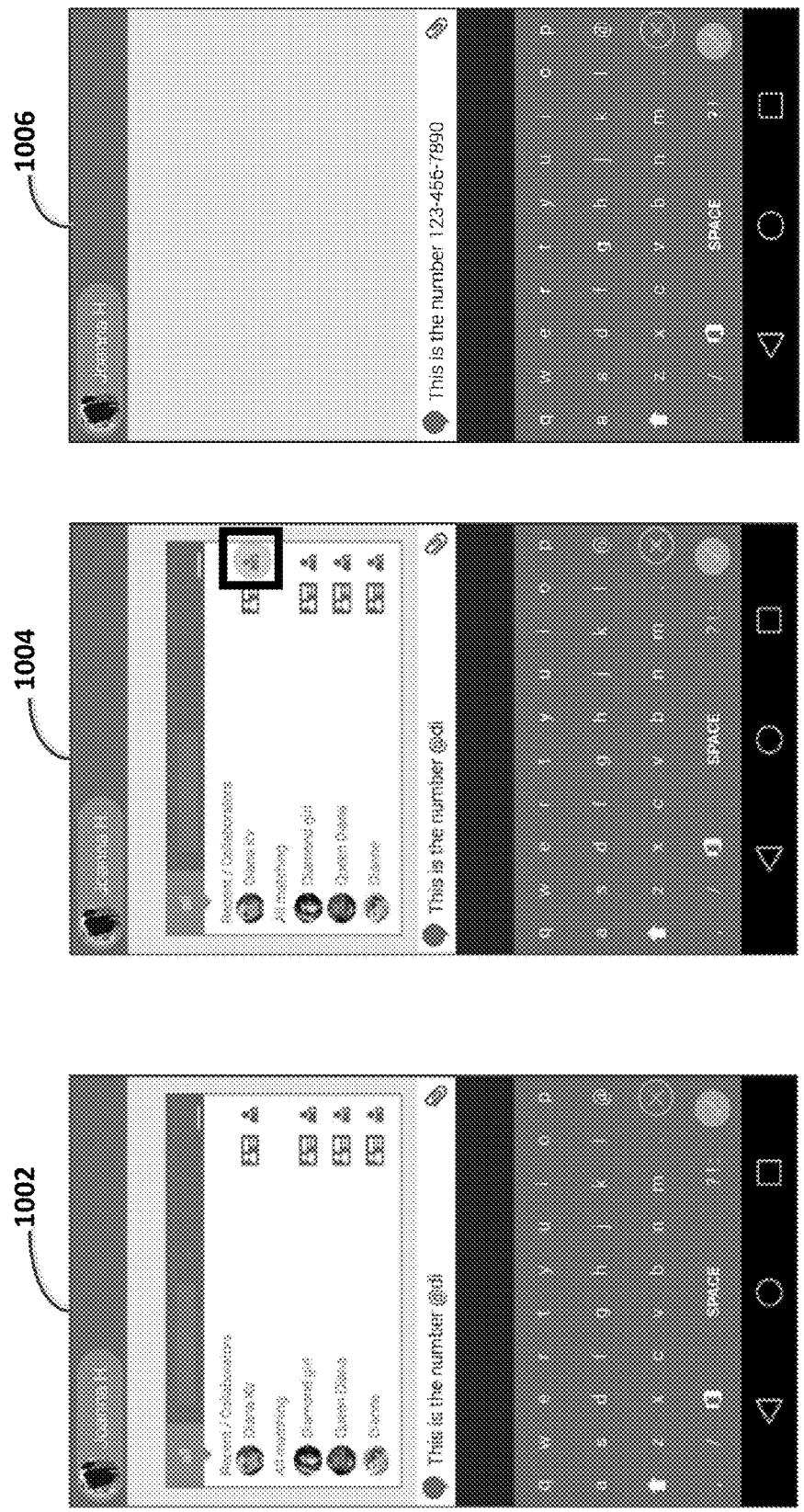

FIG. 10 illustrates processing device views 1002-1006 that highlight an interaction between a foreground application and soft input keyboard application. Similar to the process flow illustrated in FIG. 9, FIG. 10 highlights identification of a listing of contacts by a soft input keyboard application and insertion of a contact within an application canvas of a foreground application. Processing device view 1002 illustrates entry of another delimiter command (e.g., @) into an application canvas of a foreground application. In response to detection of a delimiter command such as "@" the soft input keyboard application may launch a service displaying a listing of contacts that may be relevant to an entered input (e.g., the characters, words, phrases following the entered delimiter command). For example, a listing of contacts that correspond to an input of "This is the number for di" may be displayed. In examples, the listing may be displayed within the soft input keyboard application windows or as a pop-out that temporarily displays over an application canvas of a foreground application. However, one skilled in the art should recognize that other user interface effects can be utilized to display a document listing service or any listing of content. As shown in processing device view 1004, a link to contacts/collaborators is displayed and a contact number of "Diana Kv" is selected. In response to selection of the contact number as shown in processing device view 1004, the contact number for the selected contact may be inserted into an application canvas of a foreground application as shown in processing device view 1006, providing a completion of the partial input by the user.

Figure 11:

FIG. 11 illustrates processing device view 1100 that highlights an interaction between a foreground application and soft input keyboard application. Processing device view 1100 highlights an ability to utilize a translation service (such as translation service 454 described in FIG. 4F). As shown in processing device view 1100, input 1102 may be entered into an input field of an application canvas of a foreground application. Input may be received in any language. As an example, input 1102 is displayed in Korean. In response to detection of a received input or alternatively selection of a user interface element for a translation service, an application window 1104 of the soft input keyboard application may be updated to display options for translating the received input, for example based on evaluation of a thread in the foreground application, user preferences, suggestions/recommendations, etc.

Figure 12:
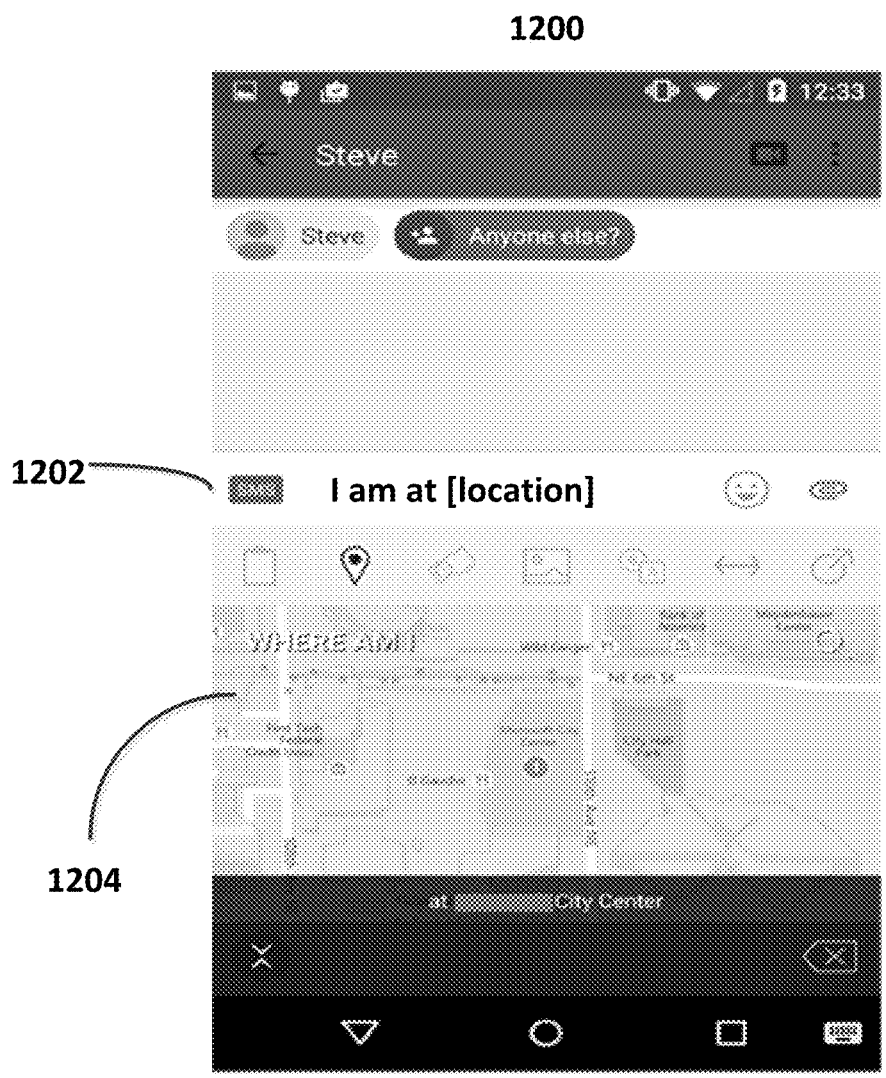

FIG. 12 illustrates processing device views 1200 that highlights an interaction between a foreground application and soft input keyboard application. Processing device view 1200 illustrates an example of contextual auto-complete described above. Processing device view 1200 highlights use of another delimiter command to provide context to assist a soft input keyboard application in identifying most appropriate resource retrieval. As an example, a user may enter into an input field an input 1202 of "I am at" including a contextual delimiter of "[location]." The soft input keyboard application may detect this input and utilize processing operations to identify a location where the processing device/user is located at, for example "City Center." As an example an application window 1204 of the soft input keyboard application may update to display location content such as map data indicating a current location, among other examples. A user may select to enter such content in an input field of the foreground application such as the input field of an SMS application. As an example, such an input may be a link for the recipient to open a map application and view the location or directions to the location, among other examples.

Figure 13:
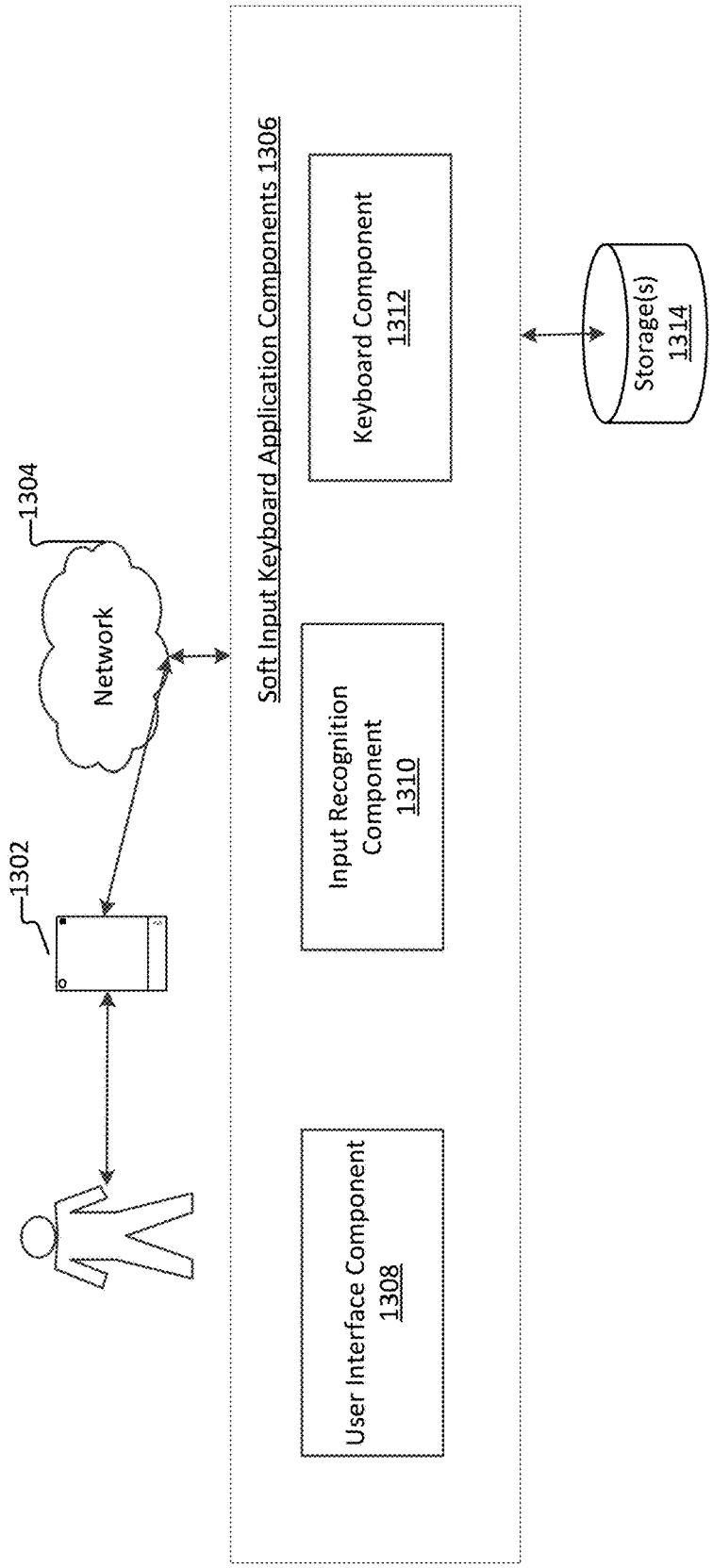
FIG. 13 illustrates an exemplary system implementable on one or more computing devices on which aspects of the present disclosure may be practiced.

FIG. 13 illustrates an exemplary system 1300 implementable on one or more computing devices on which aspects of the present disclosure may be practiced. Exemplary system 1300 presented is a combination of interdependent components that interact to form an integrated whole for learned program generation based on user example operations. Components of system 1300 may be hardware components or software implemented on and/or executed by hardware components of system 1300. In examples, system 1300 may include any of hardware components (e.g., ASIC, other devices used to execute/run an OS, and software components (e.g., applications, application programming interfaces, modules, virtual machines, runtime libraries, etc.) running on hardware. In one example, an exemplary system 1300 may provide an environment for software components to run, obey constraints set for operating, and makes use of resources or facilities of the systems/processing devices, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 1300 may vary and may include more or fewer components than those described in FIG. 13. In some examples, interfacing between components of the system 1300 may occur remotely, for example where components of system 1300 may be spread across one or more devices of a distributed network. In examples, one or more data stores/storages or other memory are associated with system 1300. For example, a component of system 1300 may have one or more data storages/memories/stores associated therewith. Data associated with a component of system 1300 may be stored thereon as well as processing operations/instructions executed by a component of system 1300. Components of the system 1300 may interface with an OS of a processing device perform processing operations related to launching and execution of a soft input keyboard application. One or more components of system 1300 may be used in providing an exemplary soft input keyboard application as a service that can be accessed by one or more entry points. An entry point is a point of entry or platform for communication with an application or service such as a soft input keyboard application. In examples, an entry point may include but is not limited to: any applications/services including search applications, intelligent personal assistant applications, first-party products/services, second-party products/services, and third-party products/services, among other examples.

Further, components of system 1300 possesses processing means and may be configured to handle any type of input including but not limited to: speech/voice input, text input, gesture input, handwritten input, among other examples. System 1300 may be scalable and configurable to operate on a variety of processing devices including but not limited to: desktop computers, laptop computers, mobile processing devices such as phones, tablets, slates, wearable processing devices (e.g., watches, glasses, earpieces), vehicular processing devices, and any other devices having at least one processor, among other examples. Exemplary system 1300 comprises soft input keyboard application components 1306 including a user interface component 1308, an input recognition component 1310, and a keyboard component 1312, where each of the identified components may comprise one or more additional components.

System 1300 may further comprise one or more storages 1314 that may store data associated with operation of one or more components of system 1300. Storages 1314 are any physical or virtual memory space. Storages 1314 may store any data for processing operations performed by components of system 1300, retained data from processing operations, training data, modeling data for execution of processing operations, and knowledge data among other examples. Furthermore, in examples, components of system 1300 may utilize knowledge data in processing by components of system 1300. Knowledge data is any data that is usable by a component of system 1300 to improve processing of any of the soft input keyboard application components 1306 where knowledge data can be obtained from resources internal or external to system 1300. In examples, knowledge data may be maintained in storage(s) 1314 or retrieved from one or more resources external to system 1300 by knowledge fetch operation. As an example, services that may be accessed by an exemplary soft input keyboard application may be considered knowledge data that may be stored locally or accessed over a distributed network.

In FIG. 13, processing device 1302 may be any device comprising at least one processor and at least one memory/storage. Examples of processing device 1302 may include but are not limited to: processing devices such as desktop computers, servers, phones, tablets, phablets, slates, laptops, watches, and any other collection of electrical components such as devices having one or more processors or circuits. In one example processing device 1302 may be a device of a user that is running an application/service as a foreground application and an exemplary soft input keyboard application. In examples, processing device 1302 may communicate with the soft input keyboard application components 1306 via a network 1304. In one aspect, network 1304 is a distributed computing network, such as the Internet.

The soft input keyboard application components 1306 are a collection of components that are used for launch and manage a soft input keyboard application. Soft input keyboard application components 1306 may comprise a user interface component 1308, an input recognition component 1310, and a keyboard component 1312. In alternative examples, one or more additional components may be created to manage operations described throughout the present disclosure. Soft input keyboard application components 1306 may be stored on one or more processing devices (e.g., client device) or access to one or more of the soft input keyboard application components 1306 may be distributed, for example through a distributed network.

The user interface component 1308 is one or more components that are configured to enable interaction with a user of an application or service associated with an application or service. Transparency and organization are brought to users of such an application/service through the user interface component 1308 where a user can interact with an application through user interface elements. As an example, the user interface component 1308 may comprise generation and display of one or more user interface elements upon a display of a processing device. For example, in response to a user action to enter input into the device, the user interface component 1308 may receive and process the request and initiate action to display a prompt for entering input into an application/service associated with a processing device upon which the application/service is executing. The user interface component 1308 may further execute as a front-end for display (e.g., graphical user interface) of back-end processing performed by the other soft input keyboard application components 1306. In examples, user interface definition files may be used to define user interface elements for fostering interaction between a user and a system/service. User interface definition files may comprise programming instructions or operations for management and display of user interface elements associated with user interface component 1308.

Input recognition component 1310 is a component of the system 1300 that receives, processes and tags a received input for recognition. The input recognition component 1310 is a component used to process received input. When an input is received, for example via the user interface component 1308, the input is transmitted to the input recognition component 1310 for processing. As examples described above, inputs processed by the input recognition component 1310 include but are not limited to speech/voice input (e.g., utterances), text input, gesture input and handwritten input, among other examples. In one example, a received input may be a query or search query, where a user enters data into a prompt and expects to receive results data from a system/service that employs the soft input keyboard application.

In examples, the input recognition component 1310 may be configured to perform processing operations that evaluate and tag/annotate a received input (e.g.,) query with data that may be useful for the soft input keyboard application and/or services to evaluate for further processing. As an example, signals evaluated by the input recognition component 1310 may comprise user context signals. User context signals are any type of signal data that can be used to gather information that can be used to evaluate a received query/query data. Examples of user context signals (or alternatively user context based query level signals) take into account a user, user location, user language data, form-factor of a user device, time data, entry point data (e.g., an application that an input was entered through), and personalization as context, among other examples. Obtaining such a diverse group of signal data may provide technical benefits, for example, where a system/service is able to better rank and return results that are most useful to a user. Exemplary user context signal data that may be collected and evaluated may comprise but is not limited to:

User Data: Any data identifying a user that initiated an input. User data may further comprise user location data such as latitude and longitude of the user when an input/query is issued.

Language Data: Data indicating languages associated with a user such as language of OS, applications etc. or preferred language for retrieval of a results data, among other examples.

Location Data: Data that may be used to identify any location data from an input/query.

Form Factor Data: Data that identifies a device type associated with an input or application or system. As an example, such data may be important because intent of an input may be very different based on the device upon which a query is initiated (e.g., desktop versus mobile); alternatively, a user intent/desire to obtain result data in a particular form/format (e.g., mobile version of an application/service).

Entry Point Data: Data that indicates a system/application/service that issued the input/query. For instance, entry point data is signal data that identifies whether a query is initiated from a search application, an intelligent personal assistant, a word processing application, a calendar application, etc.

Application Execution Data: Data indicating applications that are executing on a processing device/system. Can include data indicating detection of one or more foreground applications as well as other applications that may be executing/running on the processing device/system.

Time Data: Data that provides temporal dimensions associated with a received input/query. For instance, timestamp data may be used to evaluate relevance of result data to intent of a received input.

Personalization/Context data: Data such as location and/or language preference settings of the user of a device or application (e.g., browser, search engine, etc.). Also may consider context data of user with respect to previous queries of the user, other threads, users involved in threads, other executing applications/services, domain types, preferences, etc.

In examples, the input recognition component 1310 may acquire data for user context signals and annotate input/query data. The annotated data may be passed to other components of system 1300 such as the keyboard component 1312 for further processing. Processing operations for collecting such user context signal data may be known to one skilled in the art. In examples, such processing operations may comprise one or more computer-executable instructions/programming operations, application programming interfaces (APIs), machine learning processing, and any other type of programming application or service that can extract and annotate user context signal data. One skilled in the art should also recognize that data, for evaluation of input/query signal data such as user context signals, is collected while respecting privacy laws protecting users.

The keyboard component 1312 is a component configured to launch, execute and manage display of a soft input keyboard application. In examples, the keyboard component 1312 may interface with one or more storages (1314) to manage and programmatically update display of a soft input keyboard application executing on a processing device. In examples, the keyboard component 1312 may be configured to provide functionality described throughout this disclosure including function described in FIGS. 4A-12 and FIGS. 14A-16. As an example, the keyboard component 1312 may perform processing operations comprising but not limited to: detection of foreground applications, detection of entered input in foreground applications or the soft input keyboard application, evaluation of context associated with an input, determination of one or more services to interface with to obtain results data, integration of services including third-party services with the soft input keyboard application and extensibility, user interface element management for display and layout of soft input keyboard application, providing of suggested/recommended content, and training and updating of models associated with the soft input keyboard application, among other examples. In examples, the soft input keyboard application may continuously update to improve and customize a user experience with the soft input keyboard application. Continuous scaling and updates of training data may occur, debugging operations may be performed, metrics and telemetry analysis may be performed including employing analysis tools, sampling, test operations, flighting operations, etc. to improve processing and performance of the soft input keyboard. In examples, collected training data such as query click data and/or click graphs, user feedback, developer testing data, etc. may be collected and used to manage update of the soft input keyboard application through the keyboard component 1312.

FIGS. 14A-14E illustrate exemplary methods involving interaction with an exemplary soft input keyboard application with which aspects of the present disclosure may be practiced.

Figure 14A:
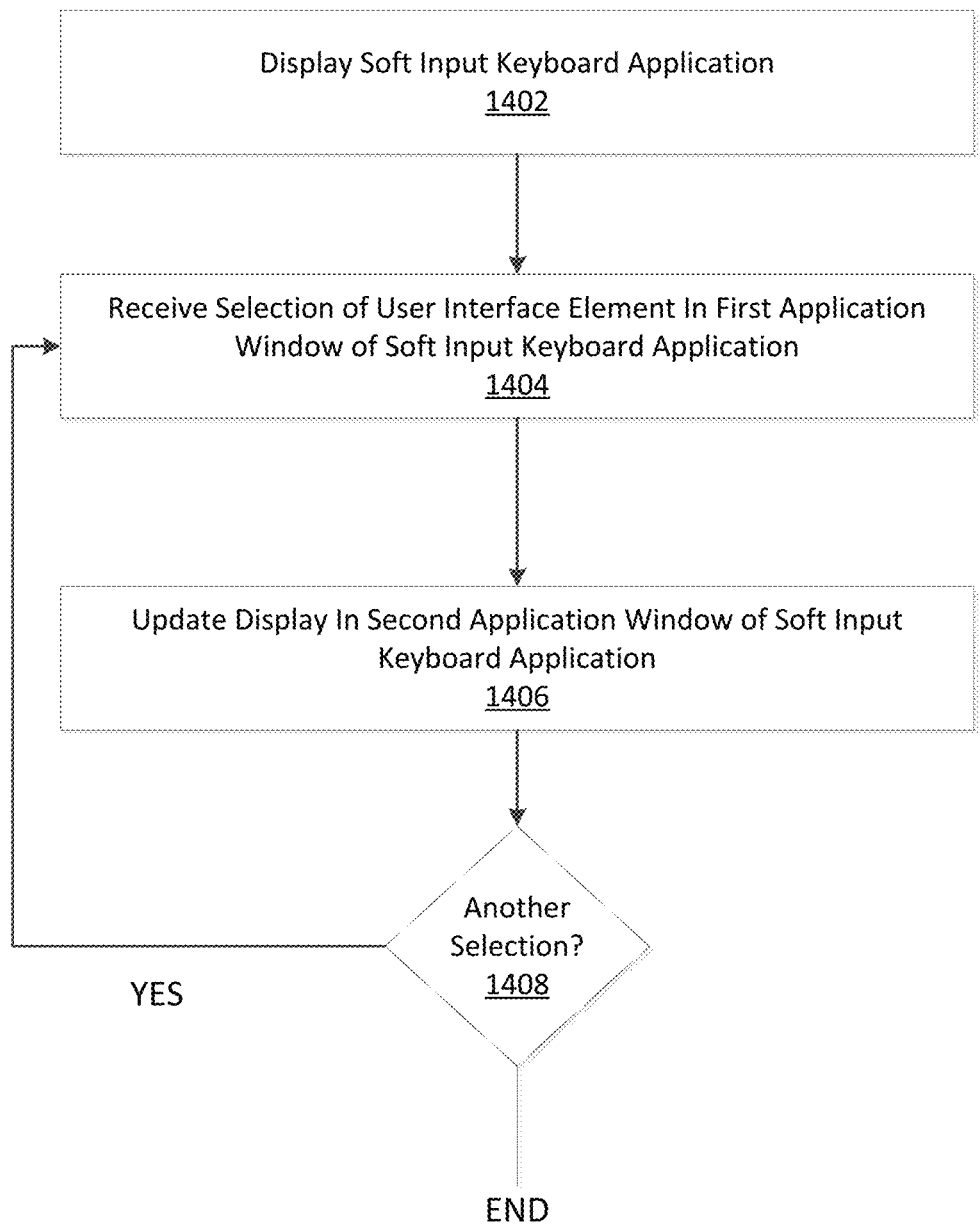

FIG. 14A illustrates an exemplary method 1400 for input detection within an exemplary soft input keyboard application. As an example, method 1400 may be executed by an exemplary system such as shown in FIGS. 1-3 and 13. In examples, method 1400 may be executed on a device comprising at least one processor configured to store and execute operations, programs or instructions. However, method 1400 is not limited to such examples. In at least one example, method 1400 may be executed (e.g., computer-implemented operations) by one or more components of a distributed network, for instance, web service/distributed network service (e.g., cloud service). In examples, operations performed in method 1400 may correspond to operations executed by a system and/or service that execute computer programs, application programming interfaces (APIs), or machine-learning processing, among other examples.

Method 1400 begins at operation 1402 where a soft input keyboard application is displayed. In an example, operation 1402 may comprise displaying a multi-window soft input keyboard application. The soft input keyboard application is used to provide application command control for one or more other applications. A soft input keyboard application may comprise a first application window that displays two or more user interface elements for services of the soft input keyboard application. In examples, the first application window displays/updates based on the detected foreground application. The user interface elements are usable for application command control of the detected foreground application. An exemplary soft input keyboard application may further comprise a second application window that displays a soft input keyboard. Display of the second application window may update including replacing display of the soft input keyboard based on selection of a user interface element of the first application window. In examples, operation 1402 may comprise displaying the soft input keyboard application simultaneously with at least one foreground application. The displayed soft input keyboard application may interface with a foreground application including detecting input received in the foreground application and transfer of content to the foreground application.

Flow may proceed to operation 1404 where selection of a user interface element is received in a first application window of the soft input keyboard application. As an example, the first application window may be first application window 404 described in the description of FIGS. 4A-4H, among other portions of the specification. Selection of a user interface element may comprise selection of a shortcut to a service integrated within the soft input keyboard application.

Flow may proceed to operation 1406 where a second application window of the soft input keyboard application is updated in response to selection of the user interface element in the first application window. As an example, the second application window may be a second application window 406 described in the description of FIGS. 4A-4H, among other portions of the specification. Update of display of the second application window may comprise replacing a display of a soft input keyboard with content associated with selection of a user interface element in the first application window. As an example, one or more additional user interface elements associated with the selection in the first application window may be displayed in the second application window. In other examples, content may be retrieved from one or more services integrated with the soft input keyboard application in the second application window in response to selection of a user interface element in the first application window.

Flow may proceed to decision operation 1408, where it is determined whether another selection is made in the soft input keyboard application. If so, flow branches YES and returns back to processing operation 1404 for further processing. If not, method 1400 ends or the soft input keyboard remains idle until further input is detected.

FIG. 14B illustrates an exemplary method 1420 for input detection within an exemplary soft input keyboard application. As an example, method 1420 may be executed by an exemplary system such as shown in FIGS. 1-3 and 13. In examples, method 1420 may be executed on a device comprising at least one processor configured to store and execute operations, programs or instructions. However, method 1420 is not limited to such examples. In at least one example, method 1420 may be executed (e.g., computer-implemented operations) by one or more components of a distributed network, for instance, web service/distributed network service (e.g., cloud service). In examples, operations performed in method 1420 may correspond to operations executed by a system and/or service that execute computer programs, application programming interfaces (APIs), or machine-learning processing, among other examples.

Method 1420 begins at operation 1422 where a soft input keyboard application is displayed. In an example, operation 1422 may comprise displaying a multi-window soft input keyboard application. The soft input keyboard application is used to provide application command control for one or more other applications. A soft input keyboard application may comprise a first application window that displays two or more user interface elements for services of the soft input keyboard application. In examples, the first application window displays/updates based on the detected foreground application. The user interface elements are usable for application command control of the detected foreground application. An exemplary soft input keyboard application may further comprise a second application window that displays a soft input keyboard. Display of the second application window may update including replacing display of the soft input keyboard based on selection of a user interface element of the first application window. In examples, operation 1422 may comprise displaying the soft input keyboard application simultaneously with at least one foreground application. The displayed soft input keyboard application may interface with a foreground application including detecting input received in the foreground application and transfer of content to the foreground application.

Flow may proceed to operation 1424 where a selection is received in a third application window of the soft input keyboard application. As an example, the third application window may be third application window 408 described in the description of FIGS. 4A-4H, among other portions of the specification. Selection of a user interface element within the third application window may trigger action for command control within the soft input keyboard application.

Flow may proceed to operation 1426 where display of the soft input keyboard application is updated based on selection of a user interface element within the third application window. For instance, the third application window 408 may provide command control including but not limited to: changing a size or state of the soft input keyboard application (e.g., minimized, maximized, closed, larger view/icons, smaller view/icons), command control over application windows including command control to navigate between content within application windows, command control to toggle display of the soft input keyboard, and command control to select and de-select content, among other examples. As an example, a second application window may be updated based on the selection. Update of display of the second application window may comprise replacing with display of a soft input keyboard, for example, in response to selection of a user interface element for toggling display of the soft input keyboard.

Flow may proceed to decision operation 1428, where it is determined whether another selection is made in the soft input keyboard application. If so, flow branches YES and returns back to processing operation 1426 for further processing. If not, method 1420 ends or the soft input keyboard remains idle until further input is detected.

Figure 14C:
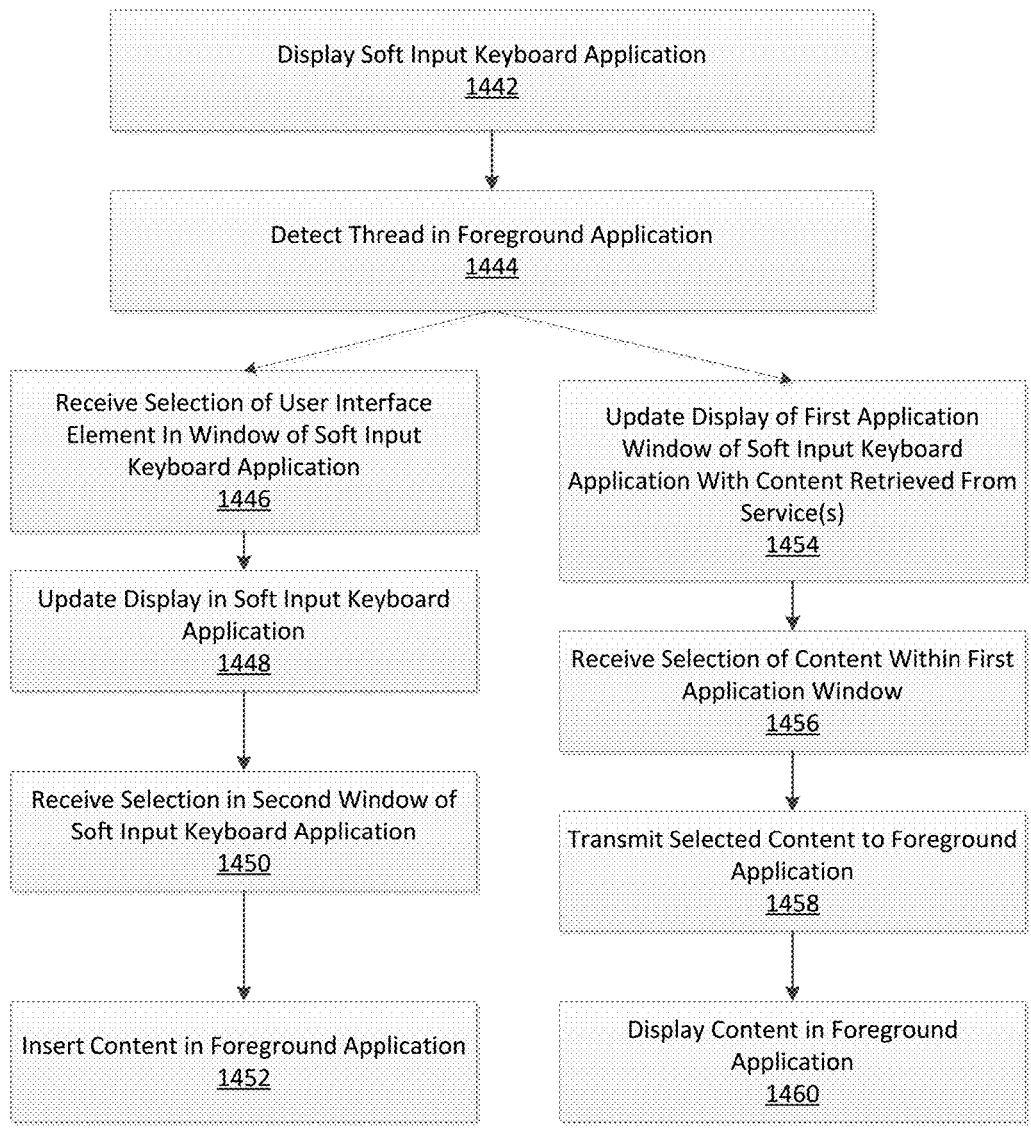

FIG. 14C illustrates an exemplary method 1440 for input detection within an exemplary soft input keyboard application. As an example, method 1440 may be executed by an exemplary system such as shown in FIGS. 1-3 and 13. In examples, method 1440 may be executed on a device comprising at least one processor configured to store and execute operations, programs or instructions. However, method 1440 is not limited to such examples. In at least one example, method 1440 may be executed (e.g., computer-implemented operations) by one or more components of a distributed network, for instance, web service/distributed network service (e.g., cloud service). In examples, operations performed in method 1440 may correspond to operations executed by a system and/or service that execute computer programs, application programming interfaces (APIs), or machine-learning processing, among other examples.

Method 1440 begins at operation 1442 where a soft input keyboard application is displayed. In an example, operation 1442 may comprise displaying a multi-window soft input keyboard application. The soft input keyboard application is used to provide application command control for one or more other applications. A soft input keyboard application may comprise a first application window that displays two or more user interface elements for services of the soft input keyboard application. In examples, the first application window displays/updates based on the detected foreground application. The user interface elements are usable for application command control of the detected foreground application. An exemplary soft input keyboard application may further comprise a second application window that displays a soft input keyboard. Display of the second application window may update including replacing display of the soft input keyboard based on selection of a user interface element of the first application window. In examples, operation 1442 may comprise displaying the soft input keyboard application simultaneously with at least one foreground application. The displayed soft input keyboard application may interface with a foreground application including detecting input received in the foreground application and transfer of content to the foreground application.

Flow may proceed to detect (operation 1444) a thread in a foreground application. As an example, a foreground application may be executing simultaneously with display of the soft input keyboard application.

In one example of method 1440, flow may proceed to operation 1446, where selection of a user interface element is received in a window of a soft input keyboard application. In one example, a user may wish to utilize one or more services within the soft input keyboard application to integrate results data retrieved from a service into the foreground application. For instance, a user may wish to obtain data on restaurants in an area to complete an input of "let's eat dinner at _____" tonight. In response, display of the soft input keyboard application is updated (operation 1448).

As an example, selection of a service associated with identifying restaurants or other places to eat, display of the soft input keyboard application may be updated (e.g., in a second application window) to show restaurants. In an alternative example, a service associated with restaurants may identify different applications for the user to select to lookup restaurants in the area. As such, selection of one of the applications may trigger further update to display of an application window that launches the selected application. Flow may proceed to receive (operation 1450) a selection within a second window of the soft input keyboard application. In response, content may be inserted (operation 1452) from the soft input keyboard application into the detected foreground application. As an example, operation 1452 may comprise transmitting the selected content from the soft input keyboard application to the foreground application.

In another example of method 1440, flow may proceed from operation 1444 to operation 1454, where display of a first application window of a soft input keyboard application is updated. That is, the soft input keyboard application may dynamically update based on detection of a foreground application and input entered into a foreground application without the need for a user to select a user interface element of the soft input keyboard application. In operation 1454, display of the first application window may be updated with content retrieved from one or more services integrated with the soft input keyboard application. In response to display of retrieved content such as results data for a received input/query, flow may proceed to operation 1456 where selection of content is received within the first application window of the soft input keyboard application. In response to the selection (operation 1456), flow may proceed to operation 1458 where the selected content is transmitted from the soft input keyboard application to the foreground application. Flow may proceed to operation 1460 where the content is displayed within the foreground application, for example in an input field, thread, multiple threads, etc.

Figure 14D:
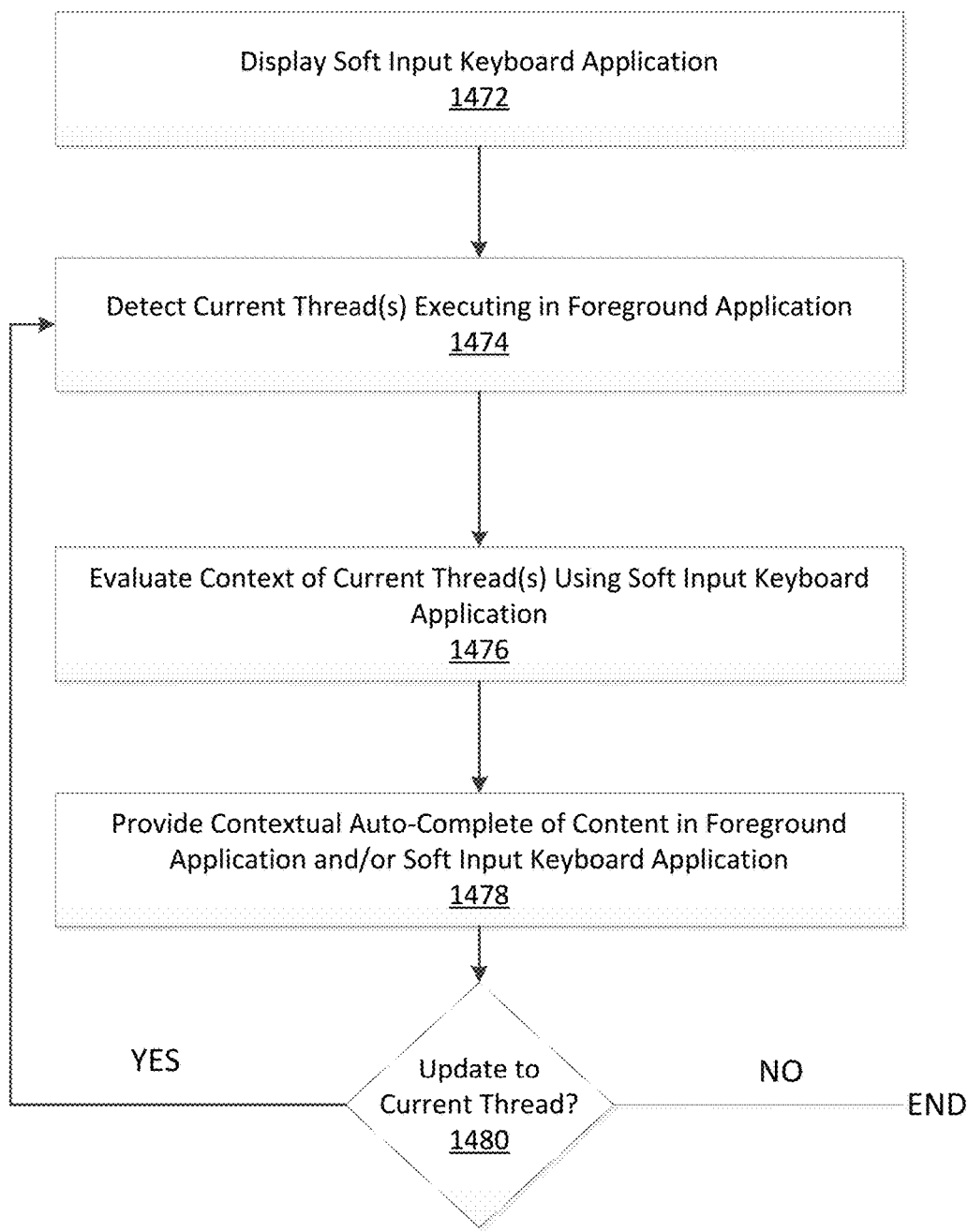

FIG. 14D illustrates an exemplary method 1470 for input detection within an exemplary soft input keyboard application. As an example, method 1470 may be executed by an exemplary system such as shown in FIGS. 1-3 and 13. In examples, method 1470 may be executed on a device comprising at least one processor configured to store and execute operations, programs or instructions. However, method 1470 is not limited to such examples. In at least one example, method 1470 may be executed (e.g., computer-implemented operations) by one or more components of a distributed network, for instance, web service/distributed network service (e.g., cloud service). In examples, operations performed in method 1470 may correspond to operations executed by a system and/or service that execute computer programs, application programming interfaces (APIs), or machine-learning processing, among other examples.

Method 1470 begins at operation 1472 where a soft input keyboard application is displayed. In an example, operation 1472 may comprise displaying a multi-window soft input keyboard application. The soft input keyboard application is used to provide application command control for one or more other applications. A soft input keyboard application may comprise a first application window that displays two or more user interface elements for services of the soft input keyboard application. In examples, the first application window displays/updates based on the detected foreground application. The user interface elements are usable for application command control of the detected foreground application. An exemplary soft input keyboard application may further comprise a second application window that displays a soft input keyboard. Display of the second application window may update including replacing display of the soft input keyboard based on selection of a user interface element of the first application window. In examples, operation 1472 may comprise displaying the soft input keyboard application simultaneously with at least one foreground application. The displayed soft input keyboard application may interface with a foreground application including detecting input received in the foreground application and transfer of content to the foreground application.

Flow may proceed to operation 1474 where one or more current threads are detected in a foreground application. Detection of a thread within a foreground application has been described in detail in previous examples. Flow may proceed to evaluate (operation 1476) a context of a current thread using the soft input keyboard application. As an example, operation 1476 may comprise evaluation of the input entered into the foreground application, for example by processing operations (e.g., APIs, machine-learning processing, etc.) to identify contextual patterns associated with the entered input. Operation 1476 may further comprise detection of entry of a delimiter command within the received input, for example, that may trigger a specific service for completion of an input. Operation 1476 may further comprise evaluating contextual signals (e.g., user context signals described in FIG. 13, among other portions of the present disclosure) to best determine a service that may satisfy an intent of a received input as well as provide context for services to evaluate the input. Flow may proceed to operation 1478 where a contextual auto-complete operation is performed to insert content (via auto-complete) into at least one of the foreground application and the soft input keyboard application. For example, processing operations by the soft input keyboard application may insert content directly into the foreground application. Alternatively, content may be provided in the soft input keyboard application for a user to further evaluate content, additional suggestions, etc., among other examples. Flow may proceed to decision operation 1480, where it is determined whether the current thread is further updated. If so, flow branches YES and returns back to processing operation 1474 for further processing. If not, method 1480 ends or the soft input keyboard remains idle until further input is detected.

Figure 14E:
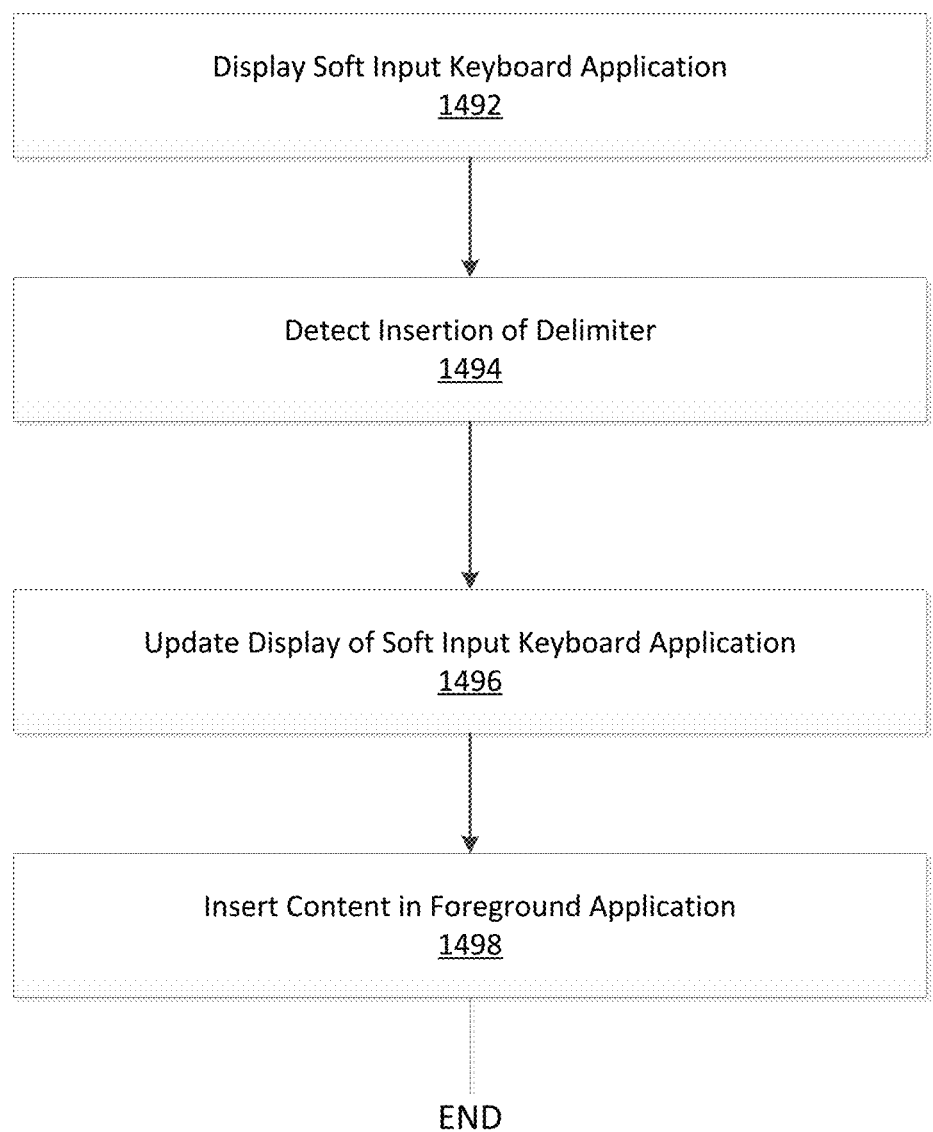

FIG. 14E illustrates an exemplary method 1490 for input detection within an exemplary soft input keyboard application. As an example, method 1490 may be executed by an exemplary system such as shown in FIGS. 1-3 and 13. In examples, method 1490 may be executed on a device comprising at least one processor configured to store and execute operations, programs or instructions. However, method 1490 is not limited to such examples. In at least one example, method 1490 may be executed (e.g., computer-implemented operations) by one or more components of a distributed network, for instance, web service/distributed network service (e.g. cloud service). In examples, operations performed in method 1490 may correspond to operations executed by a system and/or service that execute computer programs, application programming interfaces (APIs), or machine-learning processing, among other examples.

Method 1490 may be associated with detection of a delimiter command associated with the soft input keyboard application. Examples of delimiter commands, detection and processing have been described in previous examples. Method 1490 highlights the user interface interaction associated with processing of a detected delimiter command.

Method 1490 begins at operation 1492 where a soft input keyboard application is displayed. In an example, operation 1492 may comprise displaying a multi-window soft input keyboard application. The soft input keyboard application is used to provide application command control for one or more other applications. A soft input keyboard application may comprise a first application window that displays two or more user interface elements for services of the soft input keyboard application. In examples, the first application window displays/updates based on the detected foreground application. The user interface elements are usable for application command control of the detected foreground application. An exemplary soft input keyboard application may further comprise a second application window that displays a soft input keyboard. Display of the second application window may update including replacing display of the soft input keyboard based on selection of a user interface element of the first application window. In examples, operation 1492 may comprise displaying the soft input keyboard application simultaneously with at least one foreground application. The displayed soft input keyboard application may interface with a foreground application including detecting input received in the foreground application and transfer of content to the foreground application.

Flow may proceed to operation 1494 where insertion of a delimiter command is detected. As an example, operation 1494 may detect entry of a delimiter command in at least one of a foreground application and a soft input keyboard application. Flow may proceed to operation 1496 where display of the soft input keyboard application is updated based on the detected delimiter command. As an example, the soft input keyboard application may be updated (operation 1496) to display a service associated with a delimiter command or in other examples, content retrieved from a service associated with the delimiter command based on evaluation of a received input. Flow may proceed to operation 1498 where content may be inserted into a foreground application based on processing of the delimiter command and received input by the soft input keyboard application.

FIG. 15 is an exemplary method 1500 for interacting with one or more foreground applications with which aspects of the present disclosure may be practiced. As an example, method 1500 may be executed by an exemplary system such as shown in FIGS. 1-3 and 13. In examples, method 1500 may be executed on a device comprising at least one processor configured to store and execute operations, programs or instructions. However, method 1500 is not limited to such examples. In at least one example, method 1500 may be executed (e.g., computer-implemented operations) by one or more components of a distributed network, for instance, web service/distributed network service (e.g., cloud service). In examples, operations performed in method 1500 may correspond to operations executed by a system and/or service that execute computer programs, application programming interfaces (APIs), or machine-learning processing, among other examples.

Method 1500 highlights detection of a foreground application and detection of a change to a foreground application, for example, where another application is launched or detected as a current foreground application. As an example, method 1500 may be executed by a single processing device such as a client device. Flow of method 1500 begins at operation 1502 where a foreground application is displayed or launched. Flow may proceed to detect (operation 1504) input into a soft input keyboard application that may be executing along with the foreground application. Alternatively, operation 1504 may comprise detection input received in the foreground application. Data associated with the received input may be relayed (operation 1506) to one or more services associated with the soft input keyboard application. Results data may be retrieved from the one or more services and displayed (operation 1508) in at least one of the foreground application and the soft input keyboard application.

Flow may proceed to decision operation 1510 where it is determined whether a change to the foreground application is detected. Determination (operation 1510) may identify a change to a foreground application, for example, where another application is launched or detected as a current foreground application. In response to detection of a change to foreground application, flow branches YES and proceeds to operation 1512 where a display of the soft input keyboard application is updated. As an example, operation 1512 may comprise dynamically updating display of user interface elements of the soft input keyboard application to provide one or more user interface elements that may be most appropriate for the new detected foreground application. In some examples, content such as suggestions/recommendations may be displayed. Display of one or more application windows of a soft input keyboard application may be updated in operation 1512. Flow may return back to operation 1504 waiting for input to be received in the foreground application or soft input keyboard application. If no change to the foreground application is detected, flow branches NO and returns back to operation 1504 waiting for input to be received in the foreground application or soft input keyboard application.

Figure 16:
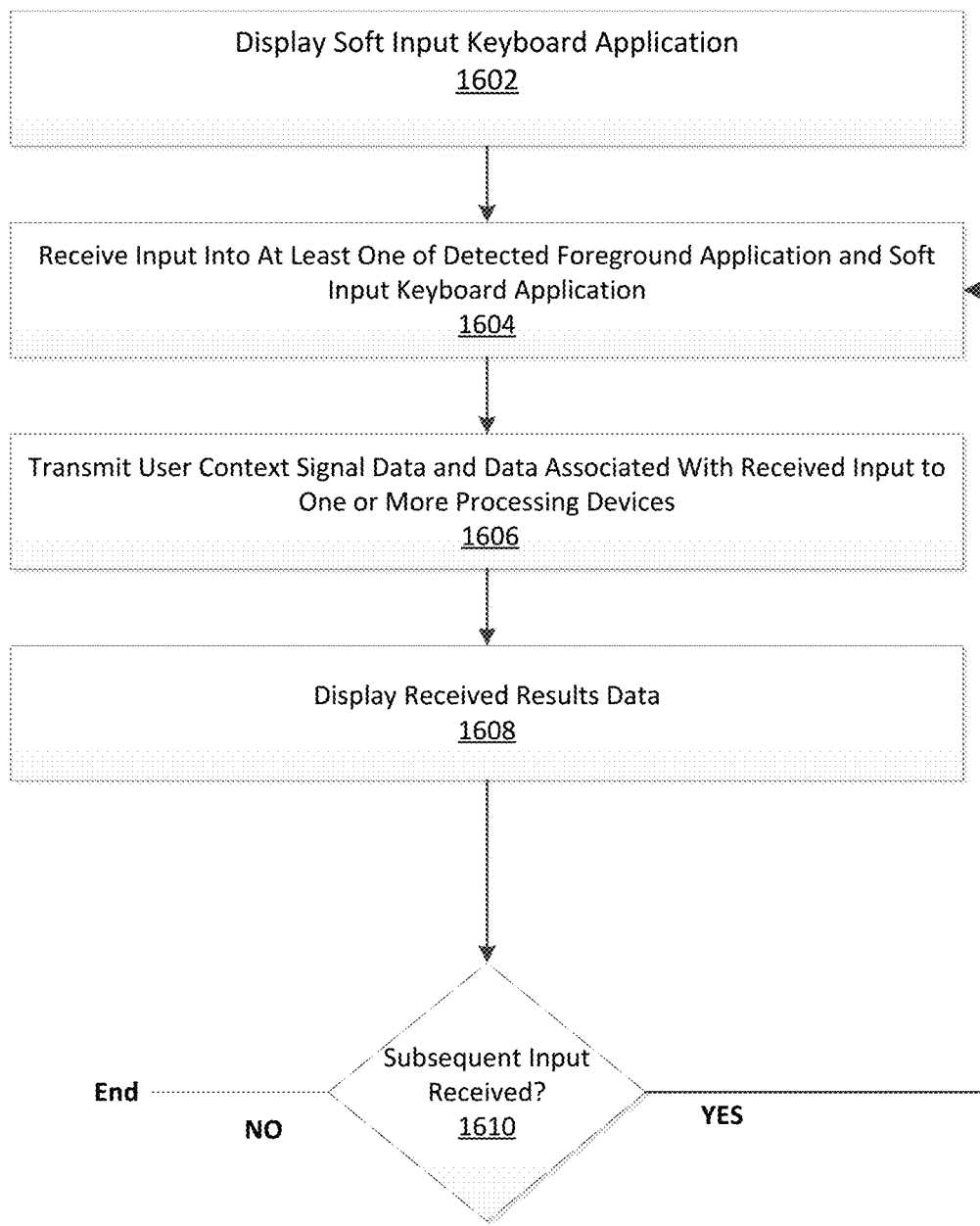
FIG. 16 is an exemplary method for providing an exemplary soft input keyboard application as a service with which aspects of the present disclosure may be practiced.

FIG. 16 is an exemplary method 1600 for providing an exemplary soft input keyboard application as a service with which aspects of the present disclosure may be practiced. As an example, method 1600 may be executed by an exemplary system such as shown in FIGS. 1-3 and 13. In examples, method 1600 may be executed on a device comprising at least one processor configured to store and execute operations, programs or instructions. However, method 1600 is not limited to such examples. In at least one example, method 1600 may be executed (e.g., computer-implemented operations) by one or more components of a distributed network, for instance, web service/distributed network service (e.g., cloud service). In examples, operations performed in method 1600 may correspond to operations executed by a system and/or service that execute computer programs, application programming interfaces (APIs), or machine-learning processing, among other examples.

Method 1600 highlights a soft input keyboard application being offered as service over a distributed network. Method 1600 may begin at operation 1602, where a soft input keyboard application is displayed. Examples of a soft input keyboard application have been previously provided as described above. Flow may proceed to operation 1604 where entry of input is detected in at least one of a detected foreground application and a soft input keyboard application. Flow may proceed to operation 1606 where user context signal data as well as data associated with a received input is transferred to one or more processing devices connected over a distributed network. Examples of user context signal data is provided in the description of FIG. 13. Data associated with the received input may comprise text or input entered into the foreground application or soft input keyboard application along with additional evaluation information provided by the soft input keyboard application based on evaluation of a context associated with the received input. Flow may to operation 1608 where results data is displayed in the soft input keyboard application. Operation 1608 may comprise receiving results data from one or more services based on the transmission (operation 1606) and display of results data/content in the soft input keyboard application. In some examples, a back and forth exchange may occur where multiple exchanges are made between the soft input keyboard application and a service retrieving results data.

Flow may proceed to decision operation 1610, where it is determined whether subsequent input is received. If so, flow branches YES and returns back to processing operation 1604 for further processing. If not, method 1600 ends or the soft input keyboard remains idle until further input is detected.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A system comprising:
   at least one processor; and
   a memory, operatively connected with the processor, that stores computer-executable instructions, which when executed cause the processor to perform operations comprising:
   displaying a soft input keyboard application, wherein the soft input keyboard application is a multi-window application command control that comprises:
      a first window that displays two or more user interface elements for services of the soft input keyboard application wherein the user interface elements are usable for application command control of a foreground application,
      a second window that displays a soft input keyboard, wherein display of the second window updates by replacing display of the soft input keyboard based on selection of a user interface element of the first window; receiving input into a foreground application via the soft input keyboard application;
   based on the received input, updating one or more user interface elements in the first window of the soft input keyboard application;
   receiving a selection of a user interface element from the one or more user interface elements in the first window;
   based on the received selection of the user interface element, displaying a plurality of representations of documents in the second window of the soft input keyboard;
   receiving a selection of one of the plurality representations of documents; and
   transferring the received input to a document corresponding to the selected representation of a document via the soft input keyboard application.

2. The system according to claim 1, wherein the soft input keyboard application further comprises:
   a third window that displays command controls for the soft input keyboard application, wherein the third window comprises: an application command control to toggle display of the soft input keyboard.

3. The system according to claim 2, wherein the computer-executable instructions cause the processor to:
   receive a selection of another user interface element in the first window;
   update display of the second window to display one or more user additional interface elements for application command control that are associated with the selected user interface element, wherein the updating further comprises replacing the soft input keyboard with display of the one or more of the additional user interface elements;
   receive, in the third window, selection of the application command control to toggle display of the soft input keyboard; and
   in response to receiving the selection in the third window, re-displaying the soft input keyboard in the second window.

4. The system according to claim 1, wherein the computer-executable instructions cause the processor to:
   detect a thread executing in the foreground application; and
   updating display of the second window to display content retrieved from a service external to the foreground application.

5. The system according to claim 4, wherein the computer-executable instructions cause the processor to:
   receive, in the second window, selection of the retrieved content; and
   in response to the selection, transmitting the retrieved content to the foreground application; and
   in response to the selection, displaying the retrieved content in the foreground application.

6. The system according to claim 1, wherein the computer-executable instructions cause the processor to:
   detect a thread executing in the foreground application;
   receiving a subsequent selection of another user interface element from the one or more user interface elements in the first window; and
   updating display of the second window to display one or more additional user interface elements for application command control that are associated with the subsequently selected user interface element, wherein the updating further comprises replacing the soft input keyboard with display of the one or more of the additional user interface elements.

7. The system according to claim 6, wherein the computer-executable instructions cause the processor to:
   receive, in the second window, selection of a user interface element for application command control; and
   in response to the selection, inserting content into the foreground application.

8. The system according to claim 1, wherein the computer-executable instructions cause the processor to:
   detect insertion of a delimiter for the soft input keyboard application in the foreground application; and
   in response to the detected insertion of the delimiter, update display of one or more of the first window and the second window.

9. The system according to claim 8, wherein the update of the display of one or more of the first window and the second window further comprises identifying one or more services associated with the delimiter, and providing content associated with the one or more services in at least one of the first window and the second window.

10. The system according to claim 1, wherein the computer-executable instructions cause the processor to:
   detect a current thread executing in the foreground application;
   evaluate a context of the current thread using the soft input keyboard application; and
   provide a contextual auto-complete of content in the foreground application based on evaluation of the context of the current thread.

11. The system according to claim 1, wherein the computer-executable instructions cause the processor to:
   detect a thread executing in the foreground application; and
   updating display of the second window to display content retrieved from two or more services that are external to the foreground application, and
   wherein the content retrieved from the two or more services comprises recommendation content determined based on evaluation of the thread executing in the foreground application.

12. A system comprising:
   at least one processor; and
   a memory, operatively connected with the processor, that stores computer-executable instructions, which when executed cause the processor to:
      display a soft input keyboard application, wherein the soft input keyboard application is a multi-window application command control that comprises:
         a first application window that displays two or more user interface elements for services of the soft input keyboard application, wherein the first application window updates based on a detected foreground application executing on the system, and wherein the user interface elements are usable for application command control of the detected foreground application,
         a second application window that displays a soft input keyboard, wherein display of the second application window updates by replacing display of the soft input keyboard based on selection of a user interface element of the first application window,
      receive input into at least one of the detected foreground application and the soft input keyboard application,
      transmit, by the soft input keyboard application, user context signal data collected from the system and data associated with the received input to at least one processing device connected with the system over a distributed network,
      receive, by the soft input keyboard application, result data including at least one conversation, wherein the result data is based on the transmitted data;
      display result data received from the at least one processing device within the second application window, wherein the result data includes representation of the at least one conversation;
      receive a selection of the representation of the at least one conversation; and
      transmit data to the selected conversation based on the received selection of the representationat.

13. The system according to claim 12, wherein the user context signal data comprises two or more selected from a group consisting of: location data for the system, language data, user data for a user of the system, data on applications executing on the system, device data for the system and time data, wherein the data associated with the received input comprises at least one of the received input and context processing signals associated with evaluating the received input, and wherein the results data is returned from one or more services associated with the at least one processing device.

14. A computer-implemented method comprising:
   displaying a soft input keyboard application, wherein the soft input keyboard application is a multi-window application command control that comprises:
      a first window that displays two or more user interface elements for services of the soft input keyboard application wherein the user interface elements are usable for application command control of a foreground application,
      a second window that displays a soft input keyboard, wherein display of the second window updates by replacing display of the soft input keyboard based on selection of a user interface element of the first window;
   receiving input into a foreground application via the soft input keyboard application;
   based on the received input, updating one or more user interface elements in the first window of the soft input keyboard application;
   receiving a selection of a user interface element from the one or more user interface elements in the first window;
   based on the received selection of the user interface element, displaying a plurality of representations of documents in the second window of the soft input keyboard;
   receiving a selection of one of the plurality representations of documents; and
   transferring the received input to a document corresponding to the selected representation of a document via the soft input keyboard application.

15. The method of claim 14, wherein the soft input keyboard application further comprises:
   a third window that displays command controls for the soft input keyboard application, wherein the third window comprises: an application command control to toggle display of the soft input keyboard.

16. The method of claim 15, further comprising:
   receiving a selection of another user interface element in the first window;
   updating display of the second window to display one or more user additional interface elements for application command control that are associated with the selected user interface element, wherein the updating further comprises replacing the soft input keyboard with display of the one or more of the additional user interface elements;
   receiving, in the third window, selection of the application command control to toggle display of the soft input keyboard; and
   in response to receiving the selection in the third window, re-displaying the soft input keyboard in the second window.

17. The method of claim 14, further comprising:
   detecting a thread executing in the foreground application; and updating display of the second window to display content retrieved from a service external to the foreground application.

18. The method of claim 17, further comprising:

receiving, in the second window, selection of the retrieved content; and in response to the selection, transmitting the retrieved content to the foreground application; and in response to the selection, displaying the retrieved content in the foreground application.

19. The method of claim 14, further comprising:

detecting a thread executing in the foreground application;

receiving a subsequent selection of another user interface element from the one or more user interface elements in the first window; and updating display of the second window to display one or more additional user interface elements for application command control that are associated with the subsequently selected user interface element, wherein the updating further comprises replacing the soft input keyboard with display of the one or more of the additional user interface elements.

20. The method of claim 19, further comprising:

receiving, in the second window, selection of a user interface element for application command control; and in response to the selection, inserting content into the foreground application.

* * * * *